United States Patent
Yim et al.

(10) Patent No.: US 10,579,260 B2
(45) Date of Patent: Mar. 3, 2020

(54) MOBILE TERMINAL HAVING DISPLAY SCREEN AND COMMUNICATION SYSTEM THEREOF FOR UNLOCKING CONNECTED DEVICES USING AN OPERATION PATTERN

(71) Applicant: LG ELECTRONICS INC., Seoul (KR)

(72) Inventors: Soyeon Yim, Seoul (KR); Jisun Lee, Seoul (KR); Seojin Lee, Seoul (KR); Jie Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 469 days.

(21) Appl. No.: 15/325,536

(22) PCT Filed: Jul. 16, 2015

(86) PCT No.: PCT/KR2015/007410
§ 371 (c)(1),
(2) Date: Jan. 11, 2017

(87) PCT Pub. No.: WO2016/021844
PCT Pub. Date: Feb. 11, 2016

(65) Prior Publication Data
US 2017/0177213 A1 Jun. 22, 2017

(30) Foreign Application Priority Data

Aug. 8, 2014 (KR) .................... 10-2014-0102362

(51) Int. Cl.
*G06F 3/0488* (2013.01)
*H04B 1/40* (2015.01)
(Continued)

(52) U.S. Cl.
CPC ......... *G06F 3/04886* (2013.01); *G04G 21/00* (2013.01); *G06F 1/163* (2013.01);
(Continued)

(58) Field of Classification Search
CPC .......... H04M 1/72577; H04M 1/7253; H04M 2250/22; H04M 1/67; G04G 21/00;
(Continued)

(56) References Cited

U.S. PATENT DOCUMENTS

| 6,720,860 B1 * | 4/2004 | Narayanaswami ..... G06F 21/31 340/5.54 |
| 2012/0038541 A1 | 2/2012 | Song et al. |

(Continued)

FOREIGN PATENT DOCUMENTS

| KR | 10-2013-0008173 A | 1/2013 |
| KR | 10-1404234 B1 | 6/2014 |
| WO | WO 2012/020864 A1 | 2/2012 |

*Primary Examiner* — Joy M Weber
(74) *Attorney, Agent, or Firm* — Birch, Stewart, Kolasch & Birch, LLP

(57) ABSTRACT

The present invention relates to a mobile terminal, which can sense a touch input in which a touch screen is tapped while the touch screen is in an inactivated state, and a communication system thereof, and provides a mobile terminal comprising: a wireless communication unit for transmitting and receiving data to/from an external terminal positioned within a predetermined distance; a touch screen converted, to another state, from one of an activated state in which the light is on and an inactivated state in which the light is off, and formed so as to sense a touch input; and a control unit for sensing, by using the touch screen, a plurality of touch inputs to be applied to the touch screen, which is in the inactivated state, unlocking a locking state when the sensed touch inputs are matched with a preset pattern, converting the touch screen, which is in the inactivated state, into the activated state, and transmitting, to the external terminal, an unlocking command formed so as to unlock the locking state of the external terminal, wherein the external terminal unlocks the locking state by responding to (Continued)

the unlocking command, and displays preset screen information on a display unit provided in the external terminal.

20 Claims, 19 Drawing Sheets

(51) Int. Cl.
| | | |
|---|---|---|
| G06F 21/31 | (2013.01) | |
| G06F 3/01 | (2006.01) | |
| G06F 3/14 | (2006.01) | |
| G06F 1/16 | (2006.01) | |
| H04M 1/725 | (2006.01) | |
| G04G 21/00 | (2010.01) | |
| G06F 3/041 | (2006.01) | |
| G06F 3/0484 | (2013.01) | |
| G06F 21/36 | (2013.01) | |
| H04B 1/3827 | (2015.01) | |
| H04M 1/67 | (2006.01) | |

(52) U.S. Cl.
CPC ............ *G06F 3/016* (2013.01); *G06F 3/0416* (2013.01); *G06F 3/0484* (2013.01); *G06F 3/04883* (2013.01); *G06F 3/1423* (2013.01); *G06F 3/1454* (2013.01); *G06F 21/31* (2013.01); *G06F 21/36* (2013.01); *H04B 1/3833* (2013.01); *H04B 1/40* (2013.01); *H04M 1/72577* (2013.01); *G06F 2203/04102* (2013.01); *G09G 2358/00* (2013.01); *H04M 1/67* (2013.01); *H04M 1/7253* (2013.01); *H04M 2250/22* (2013.01)

(58) Field of Classification Search
CPC .......... G06F 21/36; G06F 1/163; G06F 3/016; G06F 3/1423; G06F 21/31; G06F 3/1454; G06F 2203/04102; H04B 1/3833; H04B 1/40; G09G 2358/00
See application file for complete search history.

(56) References Cited

U.S. PATENT DOCUMENTS

| | | | |
|---|---|---|---|
| 2013/0065523 A1* | 3/2013 | Yun | H04M 1/7253 455/41.1 |
| 2013/0100044 A1 | 4/2013 | Zhao et al. | |
| 2013/0194223 A1 | 8/2013 | Ward et al. | |
| 2015/0138101 A1 | 5/2015 | Park et al. | |
| 2017/0109011 A1* | 4/2017 | Jiang | G06F 1/1694 |

* cited by examiner

FIG. 4
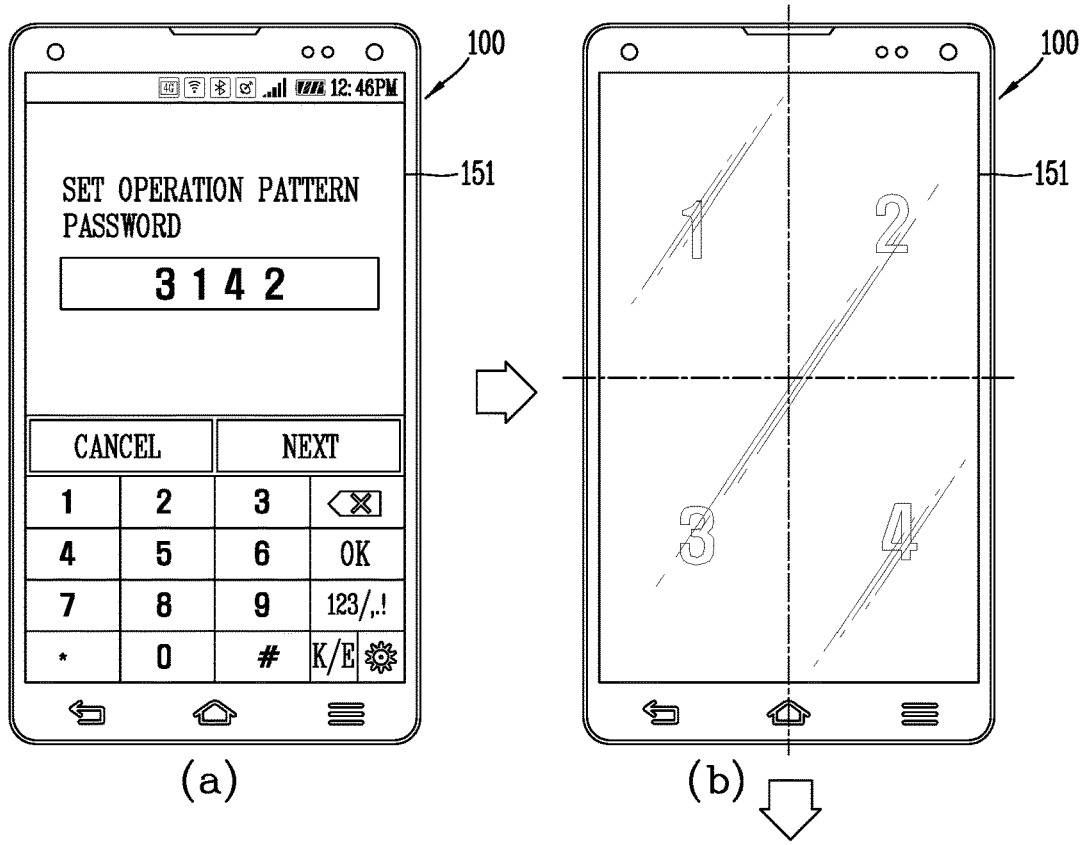
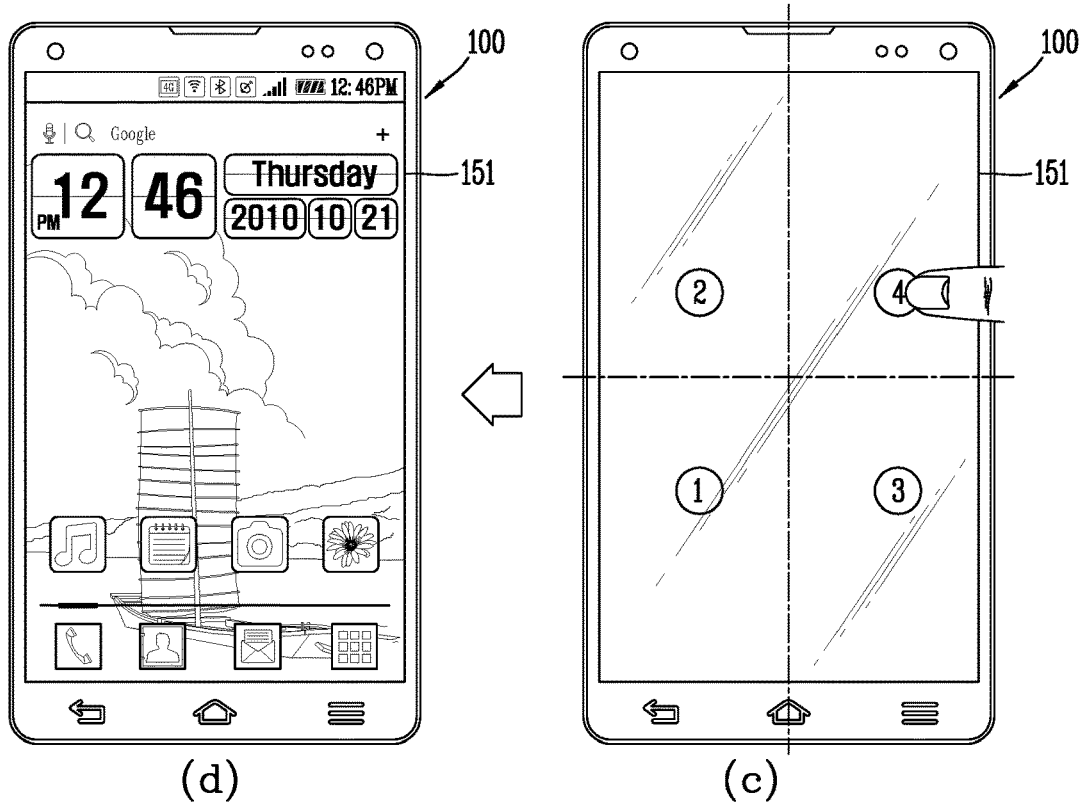

FIG. 8D
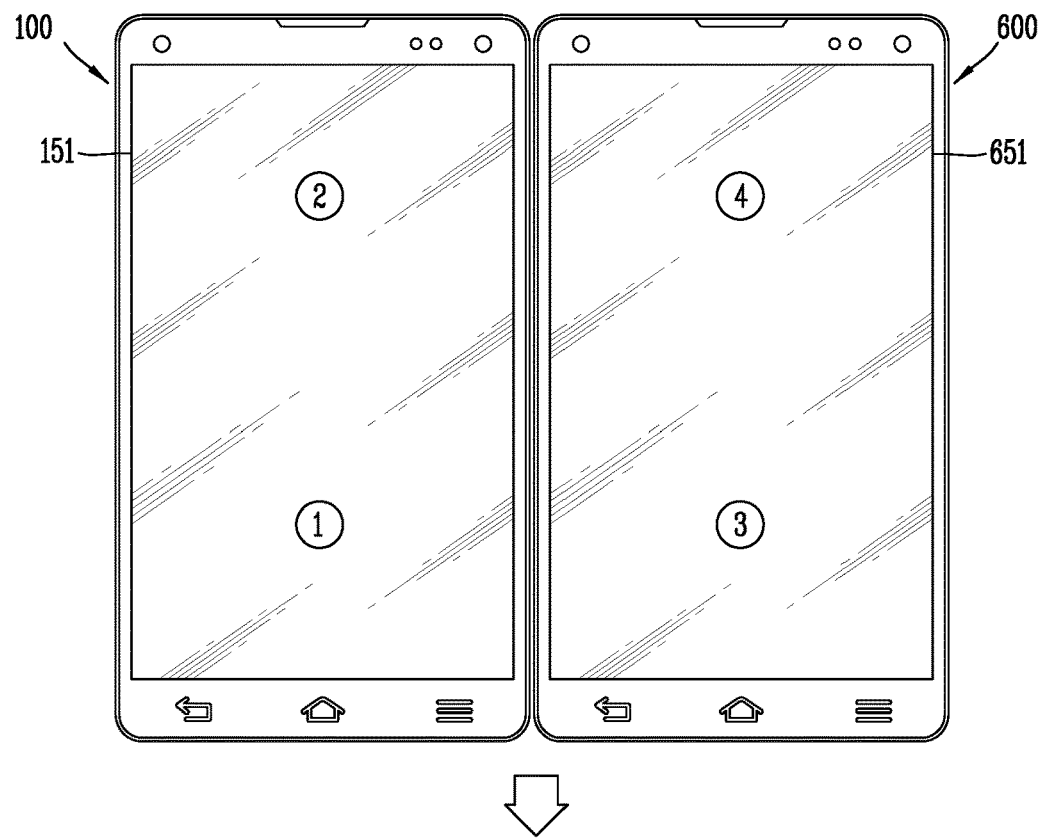
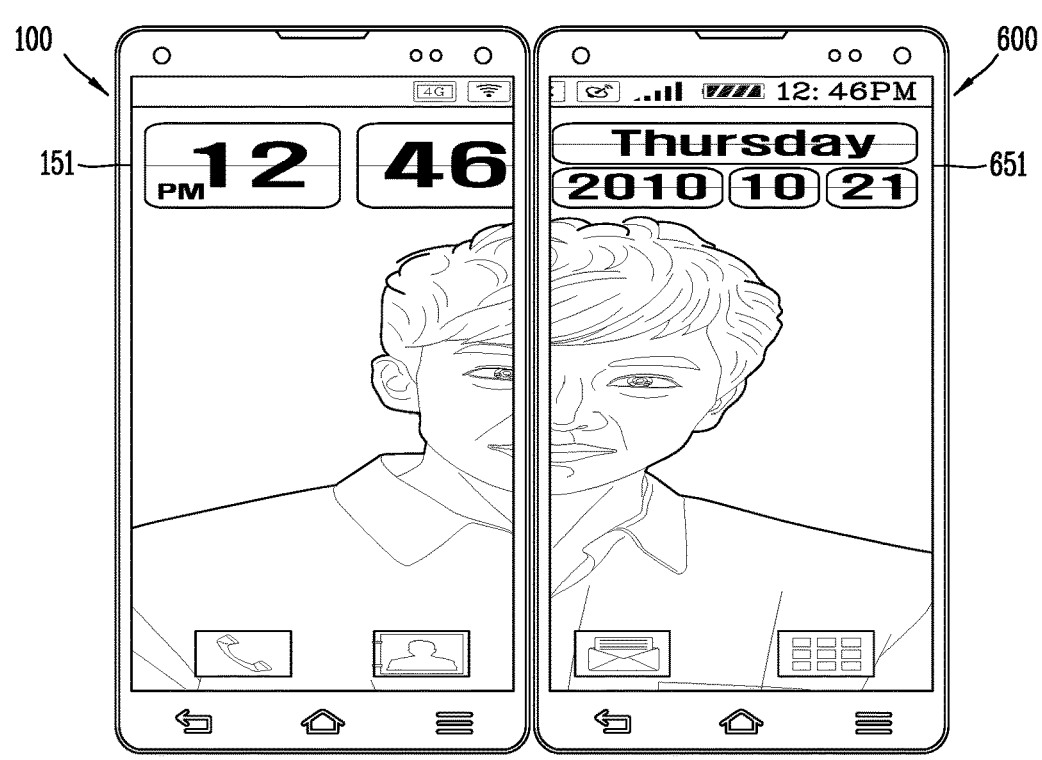

MOBILE TERMINAL HAVING DISPLAY SCREEN AND COMMUNICATION SYSTEM THEREOF FOR UNLOCKING CONNECTED DEVICES USING AN OPERATION PATTERN

CROSS REFERENCE TO RELATED APPLICATIONS

This application is the National Phase of PCT International Application No. PCT/KR2015/007410, filed on Jul. 16, 2015, which claims priority under 35 U.S.C. 119(a) to Patent Application No. 10-2014-0102362, filed in the Republic of Korea on Aug. 8, 2014, all of which are hereby expressly incorporated by reference into the present application.

TECHNICAL FIELD

The present disclosure relates to a mobile terminal capable of sensing a touch input tapping a touch screen in a deactivated state of the touch screen, and a communication system thereof.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In addition, demands on a new user interface which is capable of simply controlling a function of a terminal through a simple manipulation even in a deactivated state of a touch screen are increasing.

DISCLOSURE OF THE INVENTION

The present invention is to obviate those problems and other drawbacks. Another aspect of the detailed description is to provide a mobile terminal capable of executing a specific function in response to a plurality of touch inputs applied to a deactivated display unit, and a communication system thereof.

Another aspect of the detailed description is to provide a mobile terminal capable of converting a lock state (or locking state) into an unlocking (release) state using an operation pattern directly set by a user, and a communication system thereof.

Another aspect of the detailed description is to provide a mobile terminal capable of converting a plurality of terminals from lock states into unlock state (or unlocking state) using a single operation pattern input by a user, and a communication system thereof.

Another aspect of the detailed description is to provide a mobile terminal capable of unlocking lock states of a plurality of terminals, which are unlocked using different passwords (codes) from one another, by using a password set in one of the terminals, and a communication system thereof.

Another aspect of the detailed description is to provide a mobile terminal, in which one of a plurality of terminals is set as a master and the others are set as slaves such that the slaves can operate under the control of the master, when lock states of the plurality of terminals are unlocked by a password set in the one of the plurality of terminals, and a communication system thereof.

To achieve these and other advantages and in accordance with the purpose of the present invention, as embodied and broadly described herein, there is provided a mobile terminal, including a wireless communication unit for transmitting and receiving data to/from an external terminal positioned within a predetermined distance, a touch screen converted, to another state, from one of an activated state in which the light is on and an inactivated state in which the light is off, and formed so as to sense a touch input, and a control unit for sensing, by using the touch screen, a plurality of touch inputs to be applied to the touch screen, which is in the inactivated state, unlocking a locking state when the sensed touch inputs are matched with a preset pattern, converting the touch screen, which is in the inactivated state, into the activated state, and transmitting, to the external terminal, an unlocking command formed so as to unlock the locking state of the external terminal, wherein the external terminal unlocks the locking state by responding to the unlocking command, and displays preset screen information on a display unit provided in the external terminal.

In one embodiment disclosed herein, the control unit may set a virtual touch region including an entire region of the touch screen and an entire region of the display unit of the external terminal when the external terminal is located within the predetermined distance. The control unit may unlock the locking state, convert the touch screen from the deactivated state into the activated state, and transmit the unlocking command to the external terminal when a plurality of touch inputs applied to the virtual touch region match the preset pattern.

In one embodiment disclosed herein, the mobile terminal may further include an optical output module configured to output light corresponding to at least one of a plurality of colors. The control unit may control the optical output module to output light for guiding that the virtual touch region has been set, when the virtual touch region is set in response to the external terminal being located within the predetermined distance.

In one embodiment disclosed herein, the preset pattern may include at least one of a first pattern for unlocking the locking state of the mobile terminal, and a second pattern for unlocking a locking state of the external terminal.

In one embodiment disclosed herein, each of the touch screen and the display unit of the external terminal may output thereon a first execution screen corresponding to the first pattern when the sensed touch inputs match the first pattern. Also, each of the touch screen and the display unit of the external terminal may output thereon a second execution screen corresponding to the second pattern when the sensed touch inputs match the second pattern.

In one embodiment disclosed herein, the control unit may control the external terminal such that screen information output on the touch screen is output on the display unit of the external terminal when the sensed touch inputs match the first pattern.

In one embodiment disclosed herein, an execution of a function by a touch input applied to the display unit of the external terminal may be restricted when the external terminal is controlled by the control unit.

In one embodiment disclosed herein, a first execution screen corresponding to the first pattern may be divided into two parts to be output on the touch screen and the display unit of the external terminal, respectively, when the sensed touch inputs match the first pattern. Also, a second execution screen corresponding to the second pattern may be divided into two parts to be output on the touch screen and the display unit of the external terminal, respectively, when the sensed touch inputs match the second pattern.

In one embodiment disclosed herein, the control unit may execute the locking state, and convert the touch screen from the activated state into the deactivated state when the external terminal is moved out of the predetermined distance.

In one embodiment disclosed herein, the touch screen may output thereon a home screen of the mobile terminal, and the display unit of the external terminal may output a home screen of the external terminal when the locking state is unlocked by the sensed plurality of touch inputs.

In one embodiment disclosed herein, the preset pattern may be a pattern set by a user as a password for unlocking the locking state.

According to one aspect of the present invention to achieve the above purpose and others, there is provided a communication system, including a first terminal provided with a first wireless communication unit and a first touch screen, and configured to sense a plurality of touch inputs applied to the first touch screen in a deactivated state with a lighting device off, the first terminal unlocking a locking state and converting the first touch screen from the deactivated state into an activated state with the lighting device on when the plurality of touch inputs sensed on the first touch screen match a preset first pattern, and a second terminal provided with a second wireless communication unit and a second touch screen, and configured to sense a plurality of touch inputs applied to the second touch screen in a deactivated state with a lighting device off, the second terminal unlocking a locking state and converting the second touch screen from the deactivated state into an activated state with the lighting device on when the plurality of touch inputs sensed on the second touch screen match a preset second pattern, wherein the first terminal unlocks the locking state thereof and converts the first touch screen from the deactivated state into the activated state, and the second terminal unlocks the locking state thereof and converts the second touch screen from the deactivated state into the activated state, when the first terminal and the second terminal are located within a predetermined distance and a plurality of touch inputs matching the first pattern or the second pattern are sensed on at least one of the first touch screen and the second touch screen.

In one embodiment disclosed herein, at least one of the first touch screen and the second touch screen may be a virtual touch region including an entire region of the first touch screen and an entire region of the second touch screen.

In one embodiment disclosed herein, at least one of the first pattern and the second pattern may be a pattern set by a user as a password for unlocking the locking state.

In one embodiment disclosed herein, a first execution screen corresponding to the first pattern may be output on each of the first touch screen and the second touch screen when the plurality of touch inputs matching the first pattern are sensed. A second execution screen corresponding to the second pattern may be output on each of the first touch screen and the second touch screen when the plurality of touch inputs matching the second pattern are sensed.

In one embodiment disclosed herein, the first terminal may control the second terminal such that screen information output on the first touch screen is output on the second touch screen, when the plurality of touch inputs matching the first pattern are sensed.

In one embodiment disclosed herein, an execution of a function by a touch input applied to the second touch screen may be restricted when the second terminal is controlled by the first terminal.

In one embodiment disclosed herein, a first execution screen corresponding to the first pattern may be divided into two parts to be output on the first touch screen and the second touch screen, respectively, when the plurality of touch inputs matching the first pattern are sensed. Also, a second execution screen corresponding to the second pattern may be divided into two parts to be output on the first touch screen and the second touch screen, respectively, when the plurality of touch inputs matching the second pattern are sensed.

In one embodiment disclosed herein, the first terminal may execute the locking state and convert the first touch screen into the deactivated state, and the second terminal may execute the locking state and convert the second touch screen into the deactivated state, when at least one of the first terminal and the second terminal is moved out of the predetermined distance.

In one embodiment disclosed herein, the first touch screen may output thereon a home screen of the first terminal and the second touch screen may output thereon a home screen of the second terminal when the plurality of touch inputs matching the first pattern or the second pattern are sensed.

Advantageous Effect

A mobile terminal and a control method thereof according to the present invention can provide the following effects.

According to at least one of embodiments of the present invention, the mobile terminal executes an unlocking function based on a plurality of touch inputs applied to a main body in a deactivated state of a display unit. Since a lock state is unlocked only when an operation pattern defined by sequentially connecting touch points of the touch inputs matches a preset operation pattern, a user can unlock the lock state by a simple method of tapping an object. Accordingly, a new type of user convenience can be provided.

Also, according to at least one of embodiments of the present invention, since a lock state is unlocked when one of a plurality of unlock (or unlocking) commands defined as one operation pattern is received, the user can unlock the lock state using an operation pattern having various positions and various sizes, thereby enhancing user convenience.

According to at least one of embodiments of the present invention, a user can simultaneously release lock states of a first terminal with a first pattern set therein and a second terminal with a second pattern set therein in a manner of positioning the first terminal and the second terminal within a predetermined distance and applying the first pattern or the second pattern to a virtual touch region defined by the first terminal and the second terminal. Therefore, according to the present invention, a simple user interface for unlocking the lock state can be implemented.

Also, a touch sensor of sensing a touch in a deactivated state of a display unit of a mobile terminal according to one embodiment of the present invention is periodically activated or deactivated. In this instance, when a first tap is sensed on the deactivated display unit, the touch sensor is completely activated for sensing a second tap to be applied later. This may result in accurately calculating a pattern of the taps and also reducing power consumption by a sensing unit.

BRIEF DESCRIPTION OF THE DRAWINGS

FIG. 4 is a conceptual view illustrating operations implemented according to the present invention.

FIGS. 8A, 8B, 8C and 8D are conceptual views illustrating embodiments related to screen information output on a plurality of terminals upon unlocking lock states.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
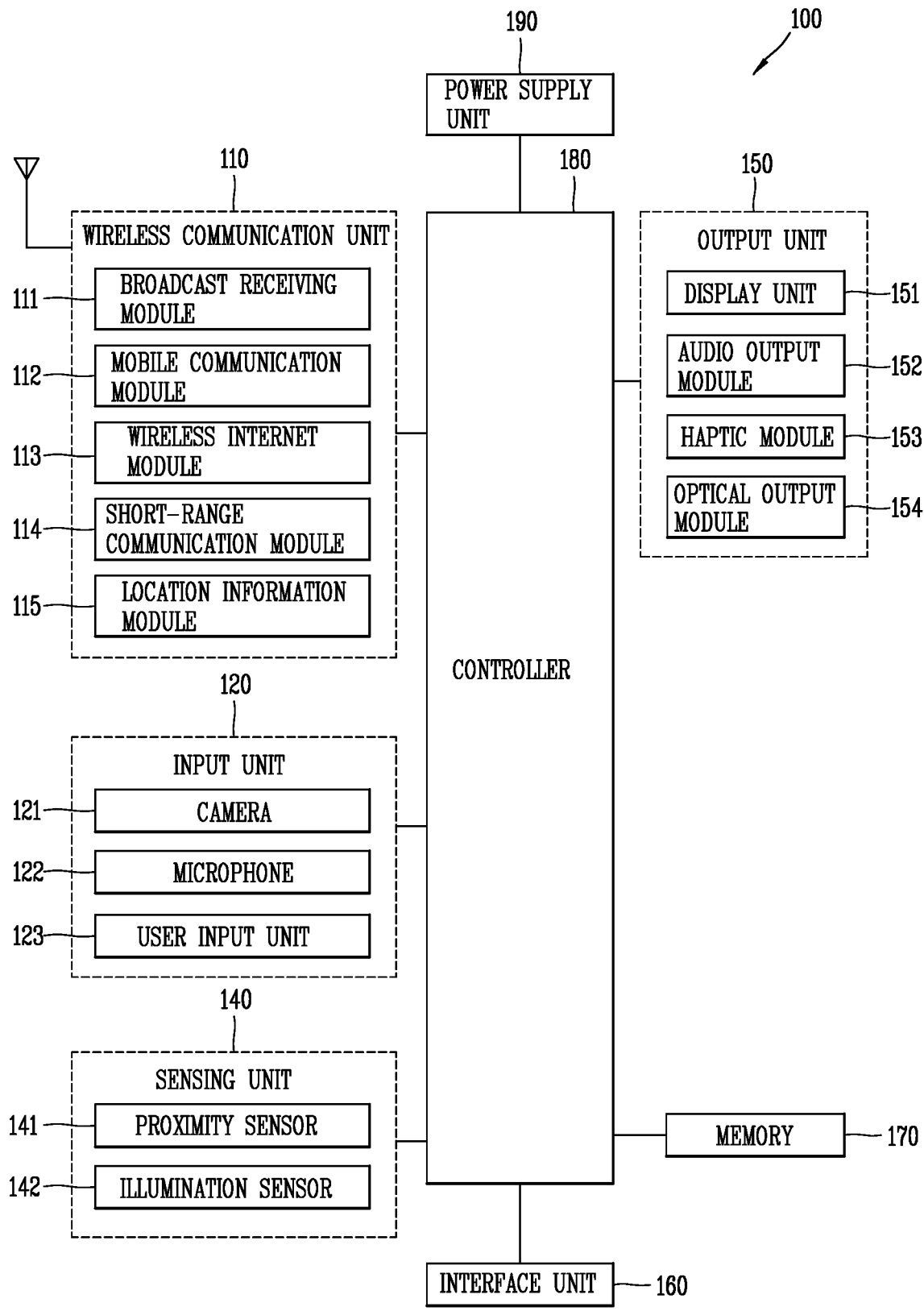
FIG. 1A is a block diagram of a mobile terminal in accordance with one exemplary embodiment of the present invention.
Figure 1B:
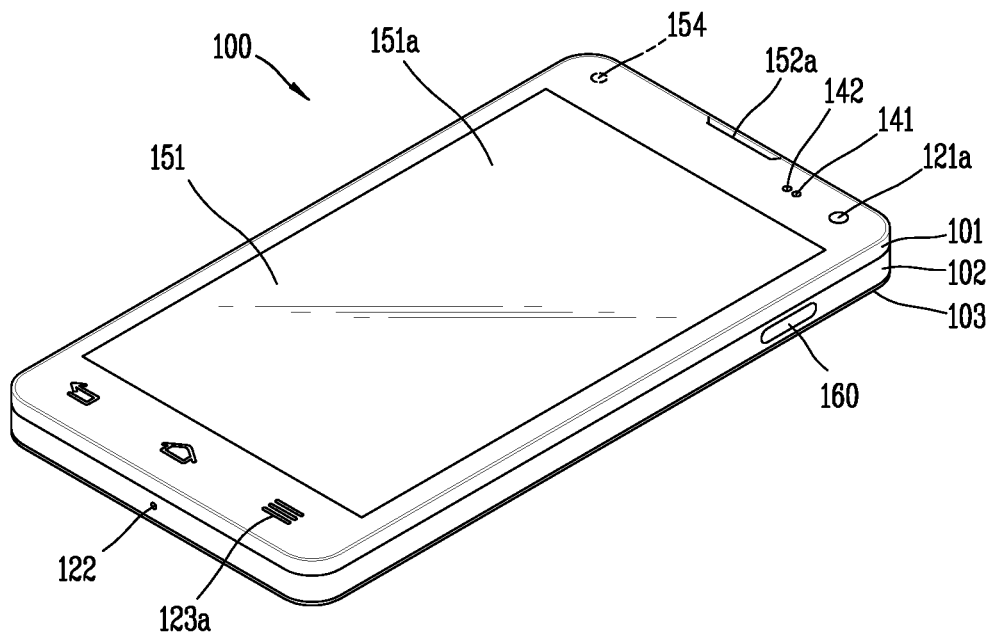
FIGS. 1B and 1C are conceptual views illustrating one example of the mobile terminal, viewed from different directions.
Figure 1C:
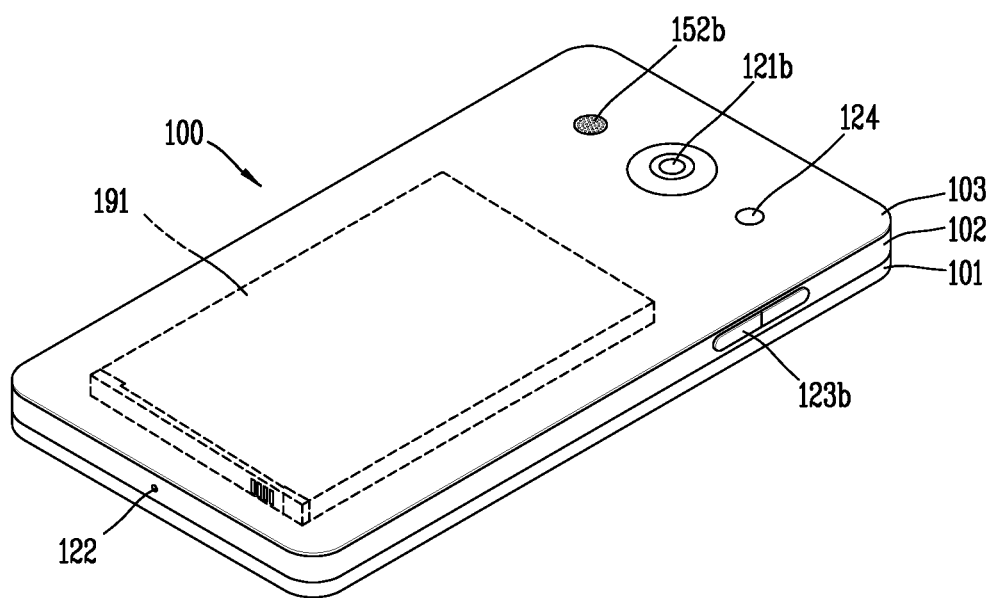

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user. Accordingly, the term of the display unit 151 may also be replaced with the touch screen.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 which performs such wireless Internet access through the mobile communication network may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NEC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Meanwhile, the sensing unit 140 of the mobile terminal 100 according to an embodiment of the present invention may further include a tap sensing unit configured to sense a tap indicating that a user hits a main body or the display unit 151 or a tap gesture. Hereinafter, a tap, a tap gesture and a touch input may be replaceably used, but used as the same meaning as "one input applied (input) by a user."

Here, the tap sensing unit may sense a gesture of hitting the main body or the display unit 151 of the mobile terminal 100. More specifically, the tap may be understood as an operation of lightly hitting the main body and the display unit 151 of the mobile terminal 100 or the article with a tap object such as a finger or an operation of bring the tap object into contact with the main body and the display unit 151 of the mobile terminal 100 or the article.

The tab object for applying the tap may be a thing capable of applying external force to the main body and the display unit 151 the mobile terminal 100 or the article, which includes, for example, a finger, a stylus pen, a pen, a pointer, a blow, and the like. The tap object is not limited to the thing capable of applying a touch input to the mobile terminal 100 according to an embodiment of the preset invention, but may include various types of things capable of applying external force to the main body and the display unit 151 of the mobile terminal 100 or the article.

The article to which the tap gesture is applied may include at least one of the main body of the mobile terminal 100 and the article on which the mobile terminal 100 is positioned.

Meanwhile, the tap or tap gesture may be sensed by at least one of an acceleration sensor and a touch sensor which are included in the tap sensing unit. Here, the acceleration sensor can measure acceleration of the main body of the mobile terminal 100 or dynamic forces, such as vibration, impact, and the like, applied to the main body and the display unit 151.

That is, the acceleration sensor may sense movement (or vibration) of the main body of the mobile terminal 100 that is caused by the tap gesture to determine whether the tap has been applied to the article. Accordingly, the acceleration sensor may sense a tap applied to the main body of the mobile terminal 100 or sense a tap applied to the article that is positioned so closely to the main body of the mobile terminal 100 to sense whether movement or vibration has occurred in the main body of the mobile terminal 100.

As such, the acceleration sensor can sense a tap applied to a point that is positioned away from the main body in addition to the main body of the mobile terminal as long as the acceleration sensor can sense the movement or vibration in the main body of the mobile terminal 100.

The mobile terminal according to an embodiment of the present invention may use only one of the acceleration sensor and the touch sensor, sequentially use the acceleration sensor and the touch sensor, or simultaneously use the acceleration sensor and the touch sensor in order to sense a tap applied to the main body or the display unit 151 of the mobile terminal 100. To sense a tap, a mode using only the acceleration sensor may be referred to as a first mode, a mode using the touch sensor may be referred to as a second mode, a mode using both of the acceleration sensor and the touch sensor (simultaneously or sequentially) may be referred to as a third mode or hybrid mode.

When a tap is sensed through the touch sensor, a position in which the tap is sensed may be found more accurately.

Meanwhile, the mobile terminal according to an embodiment of the present invention may operate in a specific mode in which minimum electric current or power is consumed even when the display unit 151 of the mobile terminal 100 is in an activated state in order to sense the tap through the acceleration sensor or touch sensor. The specific mode is referred to as a doze mode.

Here, "deactivated (inactive) state of the display unit 151" refers to a state that a light (lamp) provided in the display unit 151 to emit light is turned off. For example, in the deactivated state of the display unit 151, any information or graphic image is not output on the display unit 151.

On the other hand, "activated (active) state of the display unit 151" refers to a state that a light (lamp) provided in the display unit 151 to emit light is turned on. In the activated state of the display unit 151, a different type of screen information is output on the display unit 151 according to the control of the controller 180. Although not illustrated, when the display unit 151 is activated in a lock state, the controller 180 outputs a lock screen associated with an input of password information such that a user can input the password information for releasing the lock state.

Meanwhile, the doze mode may be a mode in which only a light emitting device for outputting a screen to the display unit 151 is turned off, and the touch sensor may be maintained in an on-state, in a touch screen structure in which the touch sensor and the display unit 151 form a mutual layer structure. When the doze mode is executed, an active state and an inactive state of the touch sensor are switched at a preset period. This is to save battery power consumed by the touch sensor when the display unit 151 is deactivated.

With a shorter activation period, the touch sensor may fast sense a touch input applied to the display unit 151, but power consumption due to the touch sensor may increase. On the other hand, with a longer activation period of the touch sensor, the power consumption by the sensing unit 140 may decrease but a touch applied to the display unit 151 may be sensed more slowly.

Therefore, the preset period may be set to be fast enough that the sensing speed cannot be recognized by the user and set to increase efficiency of the power consumption, in view of sensing the touch applied to the display unit 151. For example, the preset period may be set such that the touch sensor can be activated thirty times (30 Hz) per second. This corresponds to a minimal current level for recognizing a touch in the deactivated state of the display unit 151.

The touch sensor, which executes the doze mode in the deactivated state of the display unit 151, may execute the active mode when a first touch input is applied to the display unit 151. That is, when it is determined that the touch input is applied while the display unit 151 is in the deactivated state, the touch sensor may execute the active mode so as to more accurately sense a touch input which is to be applied later. For example, when the active mode is executed, the touch sensor may be set to be activated by about 120 times (120 Hz) per second.

When a second touch input is not sensed within the reference time from the time point that the first touch input has been applied, the touch sensor may be converted from the active mode into the doze mode. This is to prevent a malfunction of the terminal caused due to a user-unexpected tap applied.

Alternatively, the doze mode may be a mode in which the display unit 151 is turned off and the acceleration sensor is maintained in an on-state. Alternatively, the doze mode may be a mode in which the display unit 151 is turned off and both of the touch sensor and the acceleration sensor are maintained in an on-state.

Accordingly, in the doze mode, that is, when the display unit 151 is turned off, and when a user applies the touch input to at least one point on the display unit 151 or a specific point of the main body of the display unit 151 of the mobile terminal 100, at least one of the touch sensor and the acceleration sensor, which is turned on, can sense that the tap has been applied by the user.

In addition, the tap sensing unit can determine that "tap" for controlling the mobile terminal 100 has been sensed only when two or more taps are applied in a reference time. For example, when one tap is applied to the display unit 151 by the touch object for applying a touch to the display unit 151, the tap sensing unit can recognize the one tap as a touch input. That is, in this instance, the controller 180 can control a function (for example, a function of selecting an icon output at a point where the touch input is applied) according to a touch input corresponding to the one tap rather than a function corresponding to the one tap.

Accordingly, the controller 180 can determine whether "tap" for controlling one or more functions has been sensed only when two or more (or a plurality of) consecutive taps are sensed by the tap sensing unit 141 in a reference time.

That is, the tap gestures may mean that the tap gesture is sensed twice or more consecutively in the reference time. Accordingly, the phrase "tap has been sensed" used herein may mean that it has been sensed that the main body or the display unit 151 of the mobile terminal 100 is tapped substantially two or more times with an object such as a user's finger or touch pen.

Furthermore, the controller 180 can determine whether the taps are applied with the same or different fingers of the user in addition to whether the taps are sensed in the reference time. For example, when the taps are sensed on the display unit 151, the controller 180 can sense whether the taps are applied with one or different fingers by utilizing fingerprints that are sensed at points where the taps are applied. Alternatively, the controller 180 can sense whether the taps are applied with one or different fingers by recognizing positions in which the taps are sensed on the display unit 151 or accelerations which are caused by the taps through at least one of the touch sensor and acceleration sensor that are included in the tap sensing unit.

Furthermore, the controller 180 can sense whether the taps are applied with one hand or finger or both hands or at least two fingers by the user in further consideration of angles and distances at which the taps are applied or directions in which the fingerprints are recognized.

The taps may mean a plurality of hits that are sensed consecutively in a reference time. Here, the reference time may be a very short time, for example 300 ms to 2 sec.

To this end, when the tap sensing unit senses that the main body or the display unit 151 of the mobile terminal 100 is first hit, the tap sensing unit can sense a presence of a subsequent hit in a reference time after the first hit is sensed. Then, when the subsequent hit is sensed in the reference time, the tap sensing unit or the control unit 108 may determine that a tap for controlling a specific function of the mobile terminal 100 has been sensed according to an embodiment of the present invention. As such, the controller 180 can determine whether the tap has been applied by the user to control the mobile terminal 100 or just by mistake by recognizing the tap as an 'effective tap' only when a second tap is sensed in a predetermined time after the first tap is sensed.

In addition, there may be various methods for recognizing the 'effective tap.' For example, the controller 180 can recognize, as the effective tap, a second tap indicating that the main body or display unit 151 is hit a second reference number or more of times in a predetermined time after a first tap indicating that the main body or display unit 151 is hit a first reference number or more of times is sensed. Here, the first reference number may be the same as or different from the second reference number. For example, the first reference number may be one, and the second reference number may be two. Alternatively, the first reference number may be one, and also the second reference number may be one.

In addition, the controller 180 can determine that "taps" have been sensed only when the touch input is applied to a "predetermined region." That is, when a first hit is sensed on the main body of the mobile terminal 100, the controller 180 can calculate a predetermined region away from a point in which the first hit has been sensed. Then, when the "predetermined region" is hit the first or second reference number or more of times within the reference time from a time when the first hit is sensed, the controller 180 can determine the first tap or the second tap is applied.

The above described reference time and predetermined region may be varied depending on the embodiment of the present invention.

Each of the first tap and the second tap may be sensed as a separate tap depending on a position in which each tap has been sensed in addition to the reference time and the predetermined region. That is, the controller 180 can determine that the first tap and the second tap are applied when the second tap is sensed at a position spaced by a certain distance from a position in which the first tap is sensed. As such, when the first tap and the second tap are recognized based on the sensed position, the first tap and the second tap may be sensed at the same time.

In addition, when the first tap and the second tap include a plurality of touches, that is, a plurality of taps, the plurality of touches included in each of the first tap and the second tap may also be sensed at the same time. For example, while a first touch included in the first tap is sensed and at substantially the same time, a first touch included in the second tap is sensed at a position spaced a certain distance from a position in which the first touch of the first tap is sensed, the controller 180 can sense the first touches included in the first tap and the second tap. When an additional touch input is sensed at each position and then the touch is sensed at each position the first reference number or the second reference number or more of times, the controller 180 can determine that the first tap and the second tap are applied.

Meanwhile, when the tap sensing unit sensed a tap plural times, applied to the main body or the display unit 151 of the mobile terminal, the controller 180 may control at least one of functions executable on the mobile terminal 100 based on the tap sensed plural times.

For example, the controller 180 can control at least one of functions executable on the mobile terminal when the tap sensed multiple times satisfies a predetermined condition. As an example, the controller 180 may compare a plurality of preset touch input patterns with a pattern generated by the tap sensed plural times, and release the lock state of the mobile terminal 100 according to one of the plurality of preset touch input patterns.

Here, the functions may mean all kinds of functions that can be executed or driven by the mobile terminal 100. For example, one of the executable functions may be an application installed by the mobile terminal 100. For example, the phrase "execute any function" may mean that 'any application is executed or driven in the mobile terminal 100.'

As another example, the function may be a function that is needed to basically drive the mobile terminal 100. For example, the basic driving function may include a function of turning on/off a lighting device included in the display unit 151, a function of switching the mobile terminal 100 from an unlock state to a lock state or from the lock state to the unlock state, a function of setting a communication network, and a function of changing setting information of the mobile terminal 100.

Meanwhile, the controller may sense a plurality of taps applied to the display unit 151 using the touch sensor. When the plurality of taps is sensed in the inactive state of the display unit 151, the controller 180 determines whether or not the sensed plurality of taps matches a preset pattern. In this instance, the preset pattern is compared with a pattern generated by sequentially connecting tap points of the sensed taps, and sizes of the patterns do not affect matching or non-matching between the patterns. That is, when the patterns match each other even though having different sizes, it is determined that the sensed plurality of taps matches the preset pattern. When the matching is determined, the controller 180 converts the lock state into the unlock state, and activates the deactivated display unit 151. In this instance, preset screen information other than a lock screen is output on the display unit 151. For example, the preset screen information may be a home screen, or an execution screen of the latest executed function.

Hereinafter, description will be given of a mobile terminal, a mobile terminal with those components or a structure of the mobile terminal in accordance with the one embodiment of the present invention illustrated in FIG. 1A, with reference to FIGS. 1B and 1C.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152*a*, the proximity sensor 141, the illumination sensor 142, the optical output module 154, the first camera 121*a*, and the first manipulation unit 123*a*, the side surface of the terminal body is shown having the second manipulation unit 123*b*, the microphone 122, and the interface unit 160, and the rear surface of the terminal body is shown having the second audio output module 152*b* and the second camera 121*b*.

However, those components may not be limited to the arrangement. Some components may be omitted or rearranged or located on different surfaces. For example, the first manipulation unit 123*a* may be located on another surface of the terminal body, and the second audio output module 152*b* may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen. Still another example may be a pouch or cover that covers or accommodates at least one surface of the mobile terminal 100. The pouch or cover may cooperate with the display unit 151 to extend the function of the mobile terminal 100.

Meanwhile, the present invention can output information processed in the mobile terminal using a flexible display. Hereinafter, this will be described in more detail with reference to the accompanying drawing.

Figure 2:
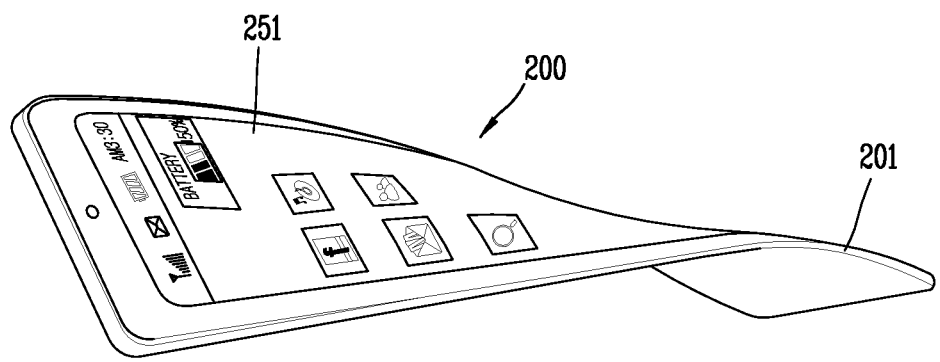
FIG. 2 is a conceptual view illustrating another example of a deformable mobile terminal in accordance with the present invention.

FIG. 2 is a conceptual view illustrating another example of a deformable mobile terminal 200 in accordance with the present invention.

As illustrated in FIG. 2, a display unit 251 may be deformable by external force. The deformation may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, the mobile terminal 200 may include the characteristics of the mobile terminal 100 of FIGS. 1A to 1C or similar characteristics.

The flexible display unit of mobile terminal 200 is generally formed as a lightweight, non-fragile display, which still exhibits characteristics of a conventional flat panel display, but is instead fabricated on a thin, flexible substrate which can be deformed to be curved, bent, folded, twisted, rolled and the like.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 (refer to FIG. 1A) can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, acceleration that the deformed flexible display unit 251 is restored, and the like. Other possibilities include most any type of information which can be sensed in response to the curving of the flexible display unit.

Also, the controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 is not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using his hand. Examples of the wearable device include a smart watch, a smart glass, a head mounted display (HMD), and the like. Hereinafter, examples of the mobile terminals extended to the wearable devices will be described.

The wearable device can exchange data (or cooperate) with another mobile terminal 100. The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 3:
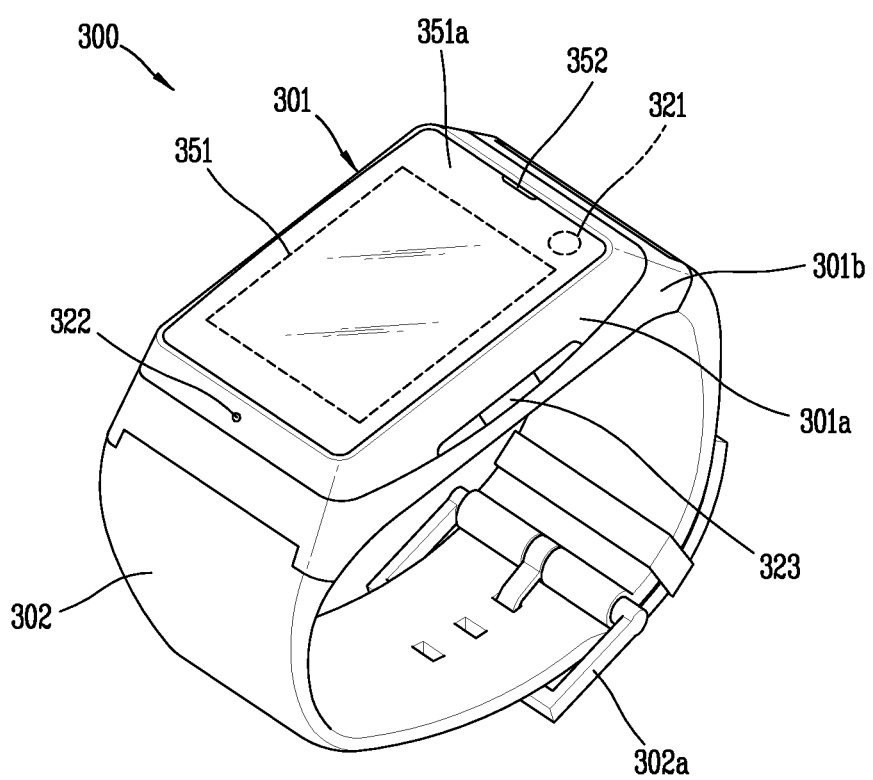
FIG. 3 is a perspective view illustrating one example of a watch type mobile terminal in accordance with another embodiment of the present invention.

FIG. 3 is a perspective view illustrating one example of a watch type mobile terminal 300 in accordance with another embodiment of the present invention.

As illustrated in FIG. 3, the watch-type mobile terminal 300 includes a main body 301 with a display unit 351 and a band 302 connected to the main body 301 to be wearable on a wrist. In general, the mobile terminal 300 may be configured to include features that are the same or similar to those of mobile terminal 100 of FIGS. 1A to 1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. The display unit 351 includes a touch sensor so that the display unit can function as a touch screen. As illustrated, a window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, it may function as the user input unit 323, and a separate key may thus not be provided on the main body 501.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

Meanwhile, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

Among others, an NFC module provided in the mobile terminal supports contactless short-range wireless communication between terminals within a distance of about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Hereinafter, description will be given of embodiments related to a control method which can be implemented in the mobile terminal having such configuration, with reference to the accompanying drawings. It will be obvious to those skilled in the art that the present invention can be specified into other specific forms without departing from the scope and essential features of the present invention.

Figure 5:
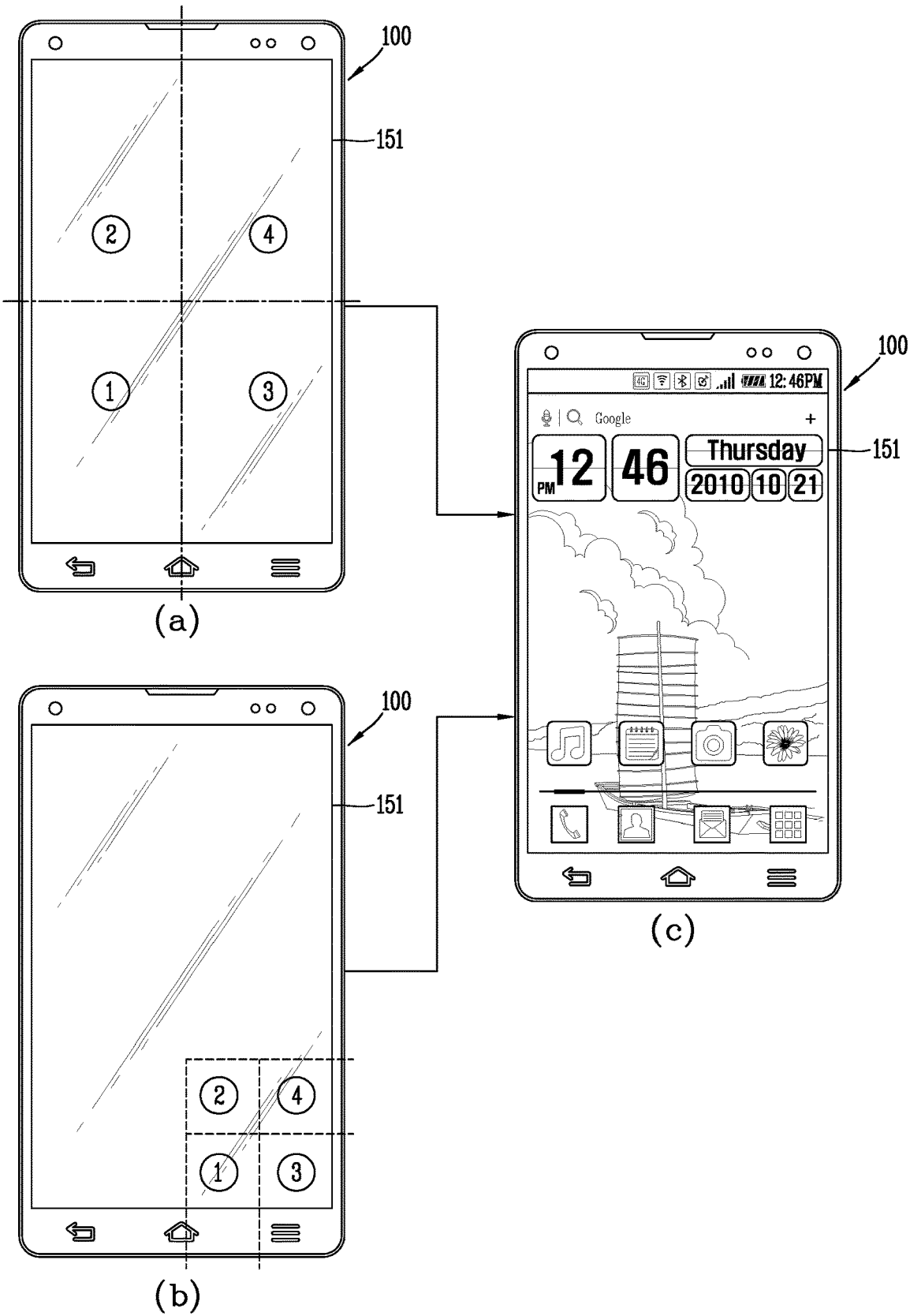
FIG. 5 is a conceptual view illustrating a method of unlocking (releasing) a lock state using patterns with various sizes in a control method described in FIG. 4.

FIG. 4 is a conceptual view illustrating operations implemented according to the present invention, and FIG. 5 is a conceptual view illustrating a method of releasing a lock state using patterns with various sizes in a control method described in FIG. 4.

First, a method of releasing a lock state (or locking state) by a user's operation pattern in a mobile terminal in accordance with one embodiment of the present invention will be described with reference to FIG. 4. The mobile terminal 100 (see FIG. 1) provides the sensing unit 140, the display unit 151 and the controller (or control unit) 180.

Here, the lock state refers to a state of restricting a reception of a control command applied by a user, namely, a state which is unlocked only when a password set by a specific person is input. In this lock state, when the display unit 151 is activated, a lock screen for inputting the password may be output on the display unit 151.

When the lock screen is output, the user may apply a preset touch onto screen information for unlocking, output on the lock screen, in order to unlock the lock state. For example, the preset touch may be a touch of drawing a path from a first point toward a second point different from the first point within a region of the display unit 151. That is, the preset touch may be a touch of drawing a pattern along a movement track of the touch. When the touch for unlocking is completed, the controller 180 may convert the lock state into an unlock state and output a home screen on the display unit 151. That is, in response to the conversion from the lock state into the unlock state, the mobile terminal may enter a mode for executing at least some of a plurality of applications installed on the mobile terminal.

Meanwhile, in the mobile terminal according to the present invention, the lock state is released on the basis of an unlock command generated by a plurality of touch inputs tapping the display unit 151 while the display unit 151 is in the deactivated state. More specifically, the unlock command may be defined as a pattern that is generated by sequentially connecting touch points of the touch inputs.

Consequently, the mobile terminal can immediately be unlocked by the plurality of touch inputs in the deactivated state of the display unit 151 and output preset screen information. The user can thus convert the deactivated state of the display unit 151 into the activated state, and unlock the terminal even without inputting a password on the display unit on which a lock screen is output. That is, a step of releasing the lock state may be reduced. Hereinafter, an operation implemented according to the present invention will be described in detail with reference to the drawings of FIG. 4.

To convert the lock state into the unlock or release state, a password for unlocking should be input. This password may be preset when producing the terminal or set or edited by a user. Meanwhile, referring to (a) of FIG. 4, a password input window (or pin code input window) for inputting the password may be output on the display unit 151 of the mobile terminal. For example, the controller 180 may output the password input window on the display unit 151 when a password setting function is executed and/or when the unlock state is converted into the lock state.

The password input window may include at least one virtual keypad, and more specifically, the virtual keypad may be a numeric keypad. The controller 180 may set a password for unlocking based on a user input applied on the virtual keypad. For example, as illustrated in (a) of FIG. 4, "3142" may be set as the password for unlocking.

Meanwhile, the controller 180 sets (or registers) an operation pattern for converting the lock state into the unlock state based on the set password. The operation pattern may be generated by touch inputs tapping the display unit 151 plural times, more particularly, by sequentially connecting touch points of the touch inputs. For example, an operation pattern that touch points of four touch inputs sequentially form vertices of an alphabet "N" may be set.

The controller 180 may divide an entire region of the display unit 151 into a plurality of regions for setting the operation pattern, and set a user operation pattern using the divided regions. For example, when the set password is "3142," the controller 180 divides the display unit 151 based on the greatest number ("4") of the input numbers. For example, as illustrated in (b) of FIG. 4, the controller 180 may divide the display unit 151 into four quadrants. The four quadrants may be provided with identification numbers sequentially from a left upper end (e.g., from first to fourth quadrants). The controller 180 may set, as a preset pattern, an operation that first to fourth touch inputs are sequentially applied to a third quadrant, a first quadrant, a fourth quadrant and a second quadrant.

Meanwhile, the present invention may not be limited to the structure that the password is configured by fourth digits and thus the entire region of the display unit 151 is divided into four quadrants. That is, the controller 180 may divide the display unit 151 into a plurality of regions in various manners, such as dividing the display unit 151 into upper/lower two quadrants or upper/middle/lower three quadrants, according to a set password, and accordingly set various operation patterns.

When the password and the pattern are set, the controller 180 may execute the lock state and deactivate or activate the display unit 151.

Meanwhile, in the deactivated state of the display unit 151, a plurality of touch inputs tapping the display unit 151 may be sensed. In this instance, the controller 180 analyzes an operation pattern that is formed by sequentially connecting tapped points of the sensed taps. When the analyzed operation pattern matches a preset pattern for unlocking, the controller 180 executes an unlocking function. The unlocking function refers to a function of unlocking the lock state, converting the display unit from the deactivated state into the activated state, and outputting preset screen information on the activated display unit 151.

For example, as illustrated in (c) of FIG. 4, when first to fourth touch inputs ①, ②, ②, ④ are sensed on four quadrants in sequence of third quadrant→first quadrant-→fourth quadrant→second quadrant, the controller 180 may determine the touch inputs as matching a preset pattern because the sensed touch inputs form the preset pattern (e.g., 'N'). In this instance, the controller 180 may execute the unlocking function, as illustrated in (d) of FIG. 4. That is, the controller 180 may activate the display unit 151 and output a home screen. The home screen may output thereon at least one object, and the object may be an icon of an application installed on the mobile terminal or a widget. Meanwhile, when the mobile terminal is converted into the unlock state, an initially-output screen does not have to be the home screen. For example, screen information which has been output the most recently on the display unit 151 before the execution of the lock state may be output as preset screen information.

According to the operating method, in the deactivated state of the display unit 151, the lock state can be unlocked based on the user's operation pattern tapping the display unit 151, thereby implementing a simple user interface.

Also, to unlock the lock state in the related art, the user should activate the display unit 151 using a button or the like and input a password using a virtual keypad included in a lock screen, but the aforementioned embodiment solves such drawback.

As such, the user can control the terminal in a new manner even in the deactivated state of the display unit.

Meanwhile, in the mobile terminal according to one embodiment of the present invention, the controller 180 may release the lock state in response to a reception of one of a plurality of unlock commands, which are defined as operation patterns formed by a plurality of touch inputs. In this instance, the unlock command refers to a command for unlocking the lock state of the display unit and converting the deactivated state of the display unit into the activated state. Hereinafter, the unlock command is referred to as "knock code."

Meanwhile, the plurality of unlock commands includes a plurality of touch inputs forming operation patterns in different sizes. That is, the plurality of unlock commands include different touch inputs forming the same operation pattern, which is generated in different sizes by connecting touch points. The plurality of unlock commands include a first unlock command and a second unlock command. The first unlock command may correspond to a plurality of touch inputs forming the operation pattern in a first size, and the second unlock command may correspond to a plurality of touch inputs forming the operation pattern in a second size different from the first size.

For example, as illustrated in (a) and (b) of FIG. 5, a preset pattern may be formed by a plurality of touch inputs, based on a password "3142," and accordingly a plurality of unlock commands may be defined. More specifically, a plurality of unlock commands may be generated by the same number (e.g., 4) of touch inputs, and the same virtual pattern (e.g., ①→②→③→④) may be formed by sequentially connecting touch points of a plurality of touch inputs but at least one of a size and an applied point of the same virtual pattern may be different. That is, that the virtual pattern is the same indicates that a form or shape of the operation pattern is the same.

Meanwhile, a distance between touch points of $n^{th}$ and $n-1^{th}$ touch inputs of the plurality of touch inputs forming the operation pattern differs according to the plurality of unlock commands. For example, a distance between touch points of a first touch input and a second touch input (① and ②) in a first unlock command illustrated in (a) of FIG. 5 is different from that in a second unlock command illustrated in (b) of FIG. 5. However, the first and second unlock commands correspond to unlock commands for performing an unlocking function. And, as illustrated in (c) of FIG. 5, when at least one unlock command of the plurality of unlock commands is sensed, the controller 180 may determine that a plurality of touch inputs matching a preset pattern have been sensed and thus output preset screen information on the display unit 151.

Hereinafter, for the sake of explanation, as illustrated in FIGS. 4 and 5, a characteristic of a touch input is simply represented using a circle. A number within the circle indicates an order that a touch input is applied, and an output position of the circle corresponds to an applied position of the touch input. When different numbers are included in one circle, it means that touch inputs corresponding to the different numbers are sequentially applied to the same position.

Meanwhile, information related to a plurality of regions cannot be output in the deactivated state of the display unit 151, but for the sake of explanation, virtual lines for dividing regions and numbers referring to the plurality of regions, respectively, may be indicated in the drawings.

According to the operating method, the user can input an operation pattern for unlocking to a different position and/or in a different size in the deactivated state of the display unit 151. For example, the user may apply an unlock command with a thumb of a right hand while holding the terminal with the right hand. In this instance, touch inputs may be applied only within a range that the thumb reaches (e.g., to a right lower region of the display unit). The controller 180 can unlock the lock state as long as an operation pattern formed the same as a preset pattern in view of the number of touch inputs and a shape. That is, the mobile terminal according to the present invention can provide the user with a user interface environment, which is more intuitive and relatively simple.

Meanwhile, development of various electronic devices, such as a portable phone, a tablet PC, a laptop computer, a watch and the like, leads to a society in which one user has a plurality of terminals. With the development, the same password or different passwords may be set in the plurality of terminals and lock states of the plurality of terminals may be executed or released in an individual manner. For example, when a first password is set in a portable phone and a second password is set in a tablet PC, the user should input the first password in the portable phone to use the portable phone and the second password in the tablet PC to use the tablet PC. Accordingly, upon desiring to use both of the portable phone and the tablet PC simultaneously, the passwords should inconveniently be input in an individual manner.

To solve such inconvenience, the present invention desires to provide a mobile terminal and a communication system for releasing lock states of a plurality of terminals located within a predetermined distance when touch inputs that match a preset pattern are sensed from one of the plurality of terminals. Hereinafter, a mobile terminal and a communication system in accordance with one embodiment of the present invention will be described in detail with reference to the accompanying drawings.

Figure 6:
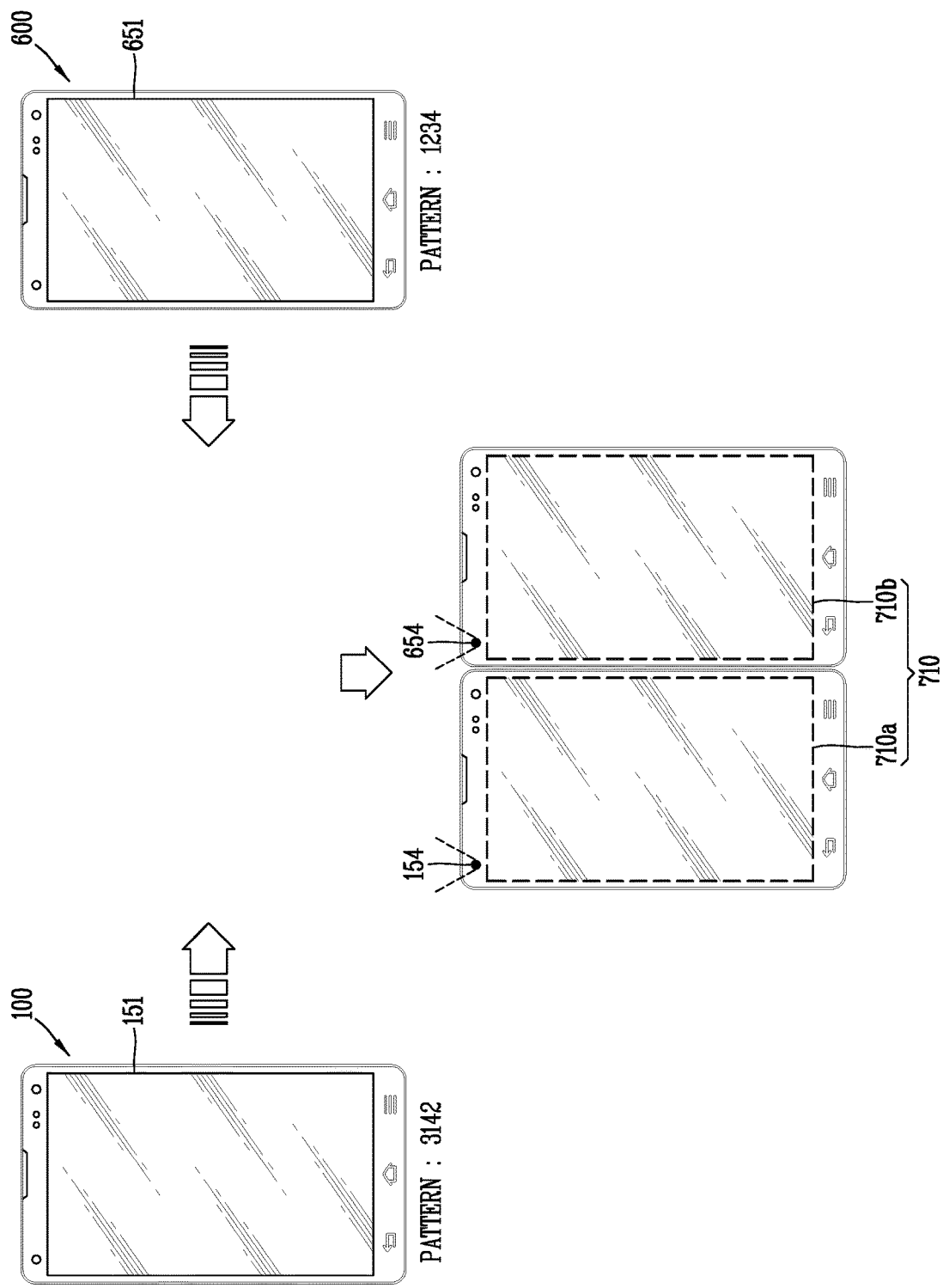
FIG. 6 is a conceptual view illustrating a communication system including a plurality of terminals in accordance with one embodiment of the present invention.
Figure 7:
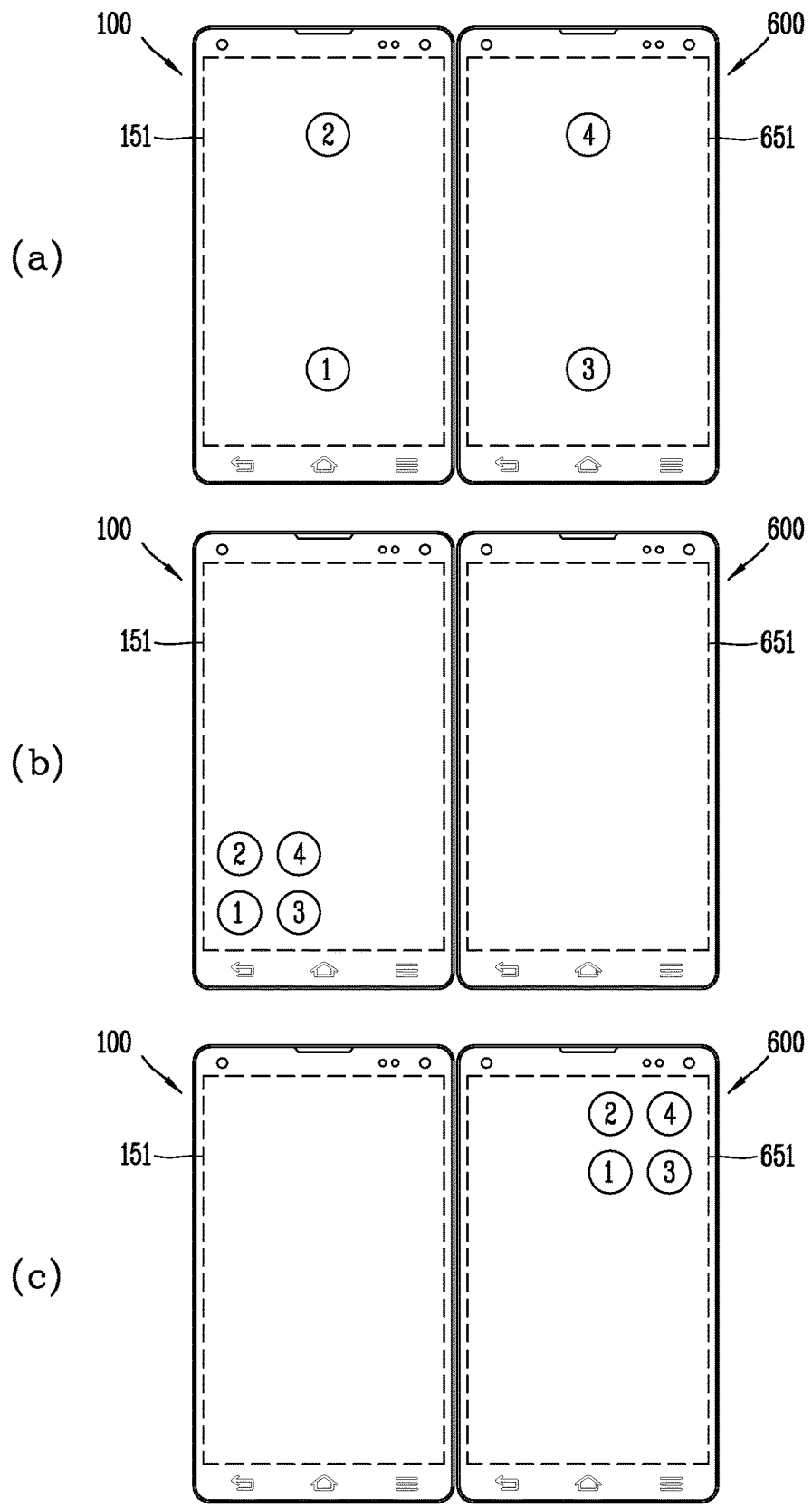
FIG. 7 is a conceptual view illustrating a method of unlocking lock states of a plurality of terminals.

FIG. 6 is a conceptual view illustrating a communication system including a plurality of terminals in accordance with one embodiment of the present invention, and FIG. 7 is a conceptual view illustrating a method of unlocking lock states of a plurality of terminals.

A communication system according to the present invention includes a plurality of terminals. For example, referring to FIG. 6, the communication system may include a first terminal 100 and a second terminal 600. Here, the first terminal 100 and the second terminal 600 may correspond to the mobile terminal described with reference to FIGS. 1 to 3, and lock states thereof may be unlocked by the method described with reference to FIGS. 4 and 5.

Hereinafter, description will be given of one embodiment in which the communication system includes the first terminal 100 and the second terminal 600, but the communication system according to the present invention may also be constructed by including more terminals such as a third terminal and the like.

The first terminal 100 and the second terminal 600 constructing the communication system operate in an individual manner. More particularly, the first terminal 100 may execute a lock state according to a condition set in the first terminal 100, and set a first pattern for unlocking the lock state. For example, the first pattern may be set as "3142" that first to fourth touch inputs ①, ②, ③, ④ are sensed in sequence of third quadrant→first quadrant→fourth quadrant→second quadrant. On the other hand, the second terminal 600 may execute a lock state according to a condition set in the second terminal 600 and set a second pattern for unlocking the lock state. For example, the second pattern may be set as "1234" that the first to fourth touch inputs ①, ②, ③, ④ are sensed in sequence of first quadrant→second quadrant→third quadrant→fourth quadrant. The first pattern and the second pattern may variously set by the user.

Meanwhile, when the first terminal 100 and the second terminal 600 are provided with wireless communication units, respectively, and located within a predetermined distance, data transmission and reception therebetween may be executed. In more detail, at least one of the first terminal 100 and the second terminal 600 may search for an external terminal which is located within a predetermined distance and performs data transmission and reception. When the external terminal is searched for, the at least one terminal can perform data transmission and reception with the searched external terminal. For example, when the second terminal 600 is searched within the predetermined distance, the first terminal 100 may transmit to or receive from the second terminal 600 terminal-related location information, coordinates information related to a touch screen, and identification information for identifying a terminal set to perform mutual data transmission and reception.

Here, the predetermined distance refers to a distance long enough to allow data transmission and reception through a short-range wireless communication network. The first terminal 100 and the second terminal 600 may execute contact or contactless short-range wireless communication therebetween within the predetermined distance.

Meanwhile, when the first terminal 100 and the second terminal 600 are located within the predetermined distance, a virtual touch region 710 is set based on the transmitted and received data. In more detail, at least one of the first terminal 100 and the second terminal 600 sets the virtual touch region 710 including an entire region of a first touch screen 151 provided on the first terminal 100 and an entire region of a second touch screen 651 provided on the second terminal 600.

The virtual touch region 710 includes an entire region 710a of a first touch screen 154, and an entire region 710b of a second touch screen 654. The virtual touch region 710 is physically separated but controlled substantially as a single touch region. That is, at least one of the first terminal 100 and the second terminal 600 may execute a control function associated with a touch input, in response to the touch input applied to the virtual touch region 710.

For example, if the second terminal 600 is not located within the predetermined distance, the first terminal 100 decides whether or not to unlock the lock state based on a plurality of touch inputs applied to the first touch screen 151. However, when the virtual touch region is set (or when the second terminal 600 is located within the predetermined distance), the first terminal 100 decides whether or not to unlock the lock state based on a plurality of touch inputs applied to the virtual touch region 710. That is, the first terminal 100 may unlock the lock state based on a plurality of touch inputs applied to at least one of the entire region 710a of the first touch screen 154 and the entire region 710b of the second touch screen 654.

Similarly, when the first terminal 100 is not located within the predetermined distance, the second terminal 600 decides whether or not to unlock the lock state based on a plurality of touch inputs applied to the second touch screen 651. However, when the virtual touch region is set (or when the first terminal 100 is located within the predetermined distance), the second terminal 600 decides whether or not to unlock the lock state based on a plurality of touch inputs applied to the virtual touch region 710.

Easily speaking, the user may input a knock code with a first pattern, which is preset in the first terminal 600, to the second terminal 600, but the lock states of the first terminal 100 and the second terminal 600 may be unlocked and the first touch screen 151 and the second touch screen 651 in a deactivated state may be converted into an activated state.

To set the virtual touch region, the first terminal 100 and the second terminal 600 may share coordinates information related to the first touch screen 151 and coordinates information related to the second touch screen 651, respectively, and also share information related to a touch input applied to the virtual touch region. In more detail, the first terminal 100 and the second terminal 600 share information related to an applied time point of a touch input, an applied touch point of the touch input, touch strength of the touch input, a touch area and the like. For example, when a touch input is applied to the first touch screen 151, the first terminal 100 may transmit information related to the applied touch input to the second terminal 200.

Accordingly, the first terminal 100 and the second terminal 600 may sense a plurality of touch inputs applied to the virtual touch region 710 in an individual or cooperative manner. The first terminal 100 and the second terminal 600 may sense touch inputs applied to the virtual touch region 710 and decide whether or not to unlock the lock states based on the sensed touch inputs.

As one example, referring to (a) of FIG. 7, first and second touch inputs may be applied to the entire region 710a of the first terminal 100 and third and fourth touch inputs may be applied to the entire region 710b of the second terminal 600. However, based on the virtual touch region 710, the first to fourth touch inputs may be determined as matching a first pattern. Also, when the first to fourth touch inputs are applied to the entire region 710a of the first terminal 100 as illustrated in (b) of FIG. 7, or applied to the entire region 710b of the second terminal 600 as illustrated in (c) of FIG. 7, the first to fourth touch inputs may be determined as matching the first pattern based on the virtual touch region 710.

When a plurality of touch inputs that match a first pattern set in the first terminal 100 or a second pattern set in the second terminal 600 are applied to the virtual touch region 710, the first terminal 100 and the second terminal 600 may unlock the lock states thereof, respectively, in response to the sensed touch inputs, and convert the display units thereof from a deactivated state into an activated state.

At least one of the first terminal 100 and the second terminal 600 determines whether or not the touch inputs applied to the virtual touch region 710 match the first or second pattern. A subject determining the matching or non-matching may change variously according to embodiments.

For example, the first terminal 100 may determine whether or not the plurality of touch inputs applied to the virtual touch region 710 match a preset first pattern. That is, the first terminal 100 determines whether or not a plurality of touch inputs applied to at least one of the entire region 710a of the first terminal 100 and the entire region 710b of the second terminal 600 match the first pattern. When the sensed plurality of touch inputs match the first pattern, the first terminal 100 unlocks the lock state thereof and converts the first touch screen 151 from a deactivated state into an activated state. The first terminal 100 also transmits an unlock command for unlocking the lock state of the second terminal 600 to the second terminal 600. The second terminal 600 then unlocks the lock state thereof, in response to the unlock command, and converts the second touch screen from a deactivated state into an activated state. Similarly, the second terminal 600 may determine whether or not a plurality of touch inputs applied to the virtual touch region 710 match a second pattern, and transmit an unlock command to the first terminal 100 according to the determination result.

As another example, the first terminal 100 and the second terminal 600 may physically be distinguished but can simultaneously execute a process for the virtual touch region 710. Like a dual core, the first terminal 100 and the second terminal 600 may determine together whether or not a plurality of touch inputs applied to the virtual touch region 710 match one of the first pattern and the second pattern. When matching the one pattern, the lock states of the first terminal 100 and the second terminal 600 are unlocked and the first touch screen 151 and the second touch screen 654 are activated.

As another example, when the virtual touch region 710 is set, the first terminal 100 and the second terminal 600 may compare physical performances with each other. Accordingly, one terminal having a relatively higher performance may be set as a master and another terminal may be set as a slave. The master may execute a calculation for touch inputs applied to the virtual touch region 710, and determine whether or not the sensed touch inputs match the first or second pattern. According to the matching result, the master can control itself and also control the slave to operate the same as a master. That is, the master may unlock the lock states of the master and the slave and control the first touch screen 151 and the second touch screen 654 to be activated.

Meanwhile, when the virtual touch region is set, the first terminal 100 may guide through the optical output module 154 that the virtual touch region has been set. In more detail, the first terminal 100 may output light for notifying that the virtual touch region has been set by use of the optical output module 154 for outputting light corresponding to at least one of a plurality of colors. For example, as illustrated in FIG. 6, the set state of the virtual touch region can be notified to the user by blinking a preset color of light plural times. Similarly, when the virtual touch region is set, the second terminal 600 may also guide the set state of the virtual touch region using the optical output module 654.

According to the operating method, the user can unlock the lock states of the first terminal 100 and the second terminal 600 at once, by positioning the first terminal 100 with a preset first pattern and the second terminal 600 with a preset second pattern within a predetermined distance and applying the first pattern or the second pattern to the virtual touch region 710 formed by the first terminal 100 and the second terminal 600. Therefore, a simple user interface for unlocking lock states can be implemented according to the present invention.

FIGS. 8A, 8B, 8C and 8D are conceptual views illustrating embodiments related to screen information output on a plurality of terminals upon unlocking lock states.

According to an embodiment of the present invention, when a plurality of touch inputs applied to a virtual touch region match a first pattern set in a first terminal or a second pattern set in a second terminal, the first terminal and the second terminal release the lock states thereof and activate their deactivated touch screens, respectively. In this instance, screen information output on a first touch screen provided on the first terminal and a second touch screen provided on the second terminal may change in various manners.

Figure 8A:
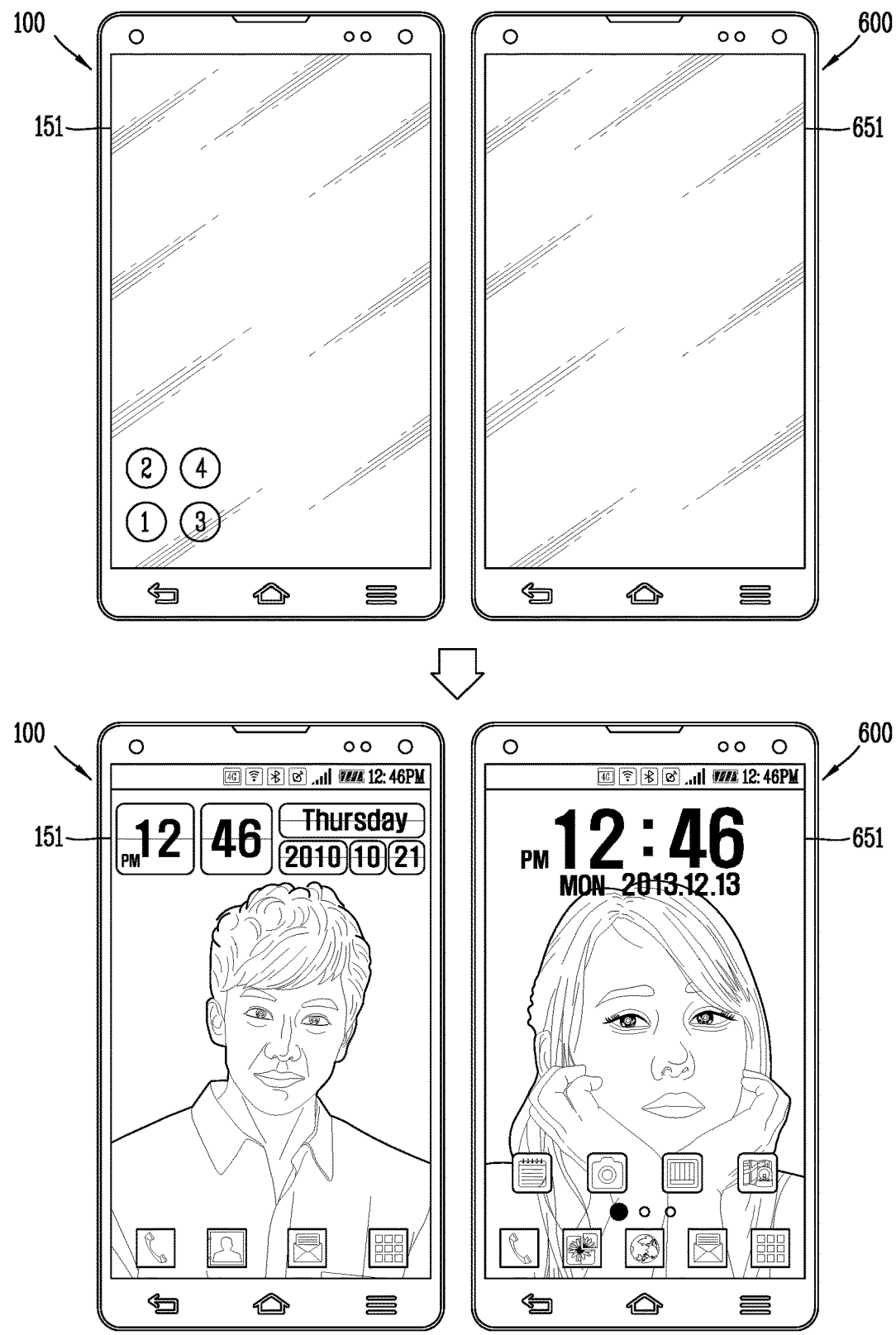

As one example, referring to FIG. 8A, the first terminal 100 may output on the first touch screen 151 a first home screen set in the first terminal 100 or an execution screen of the most recently executed function on the first terminal 100. On the other hand, the second terminal 600 may output on the second touch screen 651 a second home screen set in the second terminal 600 or an execution screen of the most recently executed function on the second terminal. That is, different screen information may be output on the first touch screen 151 and the second touch screen 651. This may allow the user to use the first terminal 100 and the second terminal 600 in an independent manner.

Figure 8B:
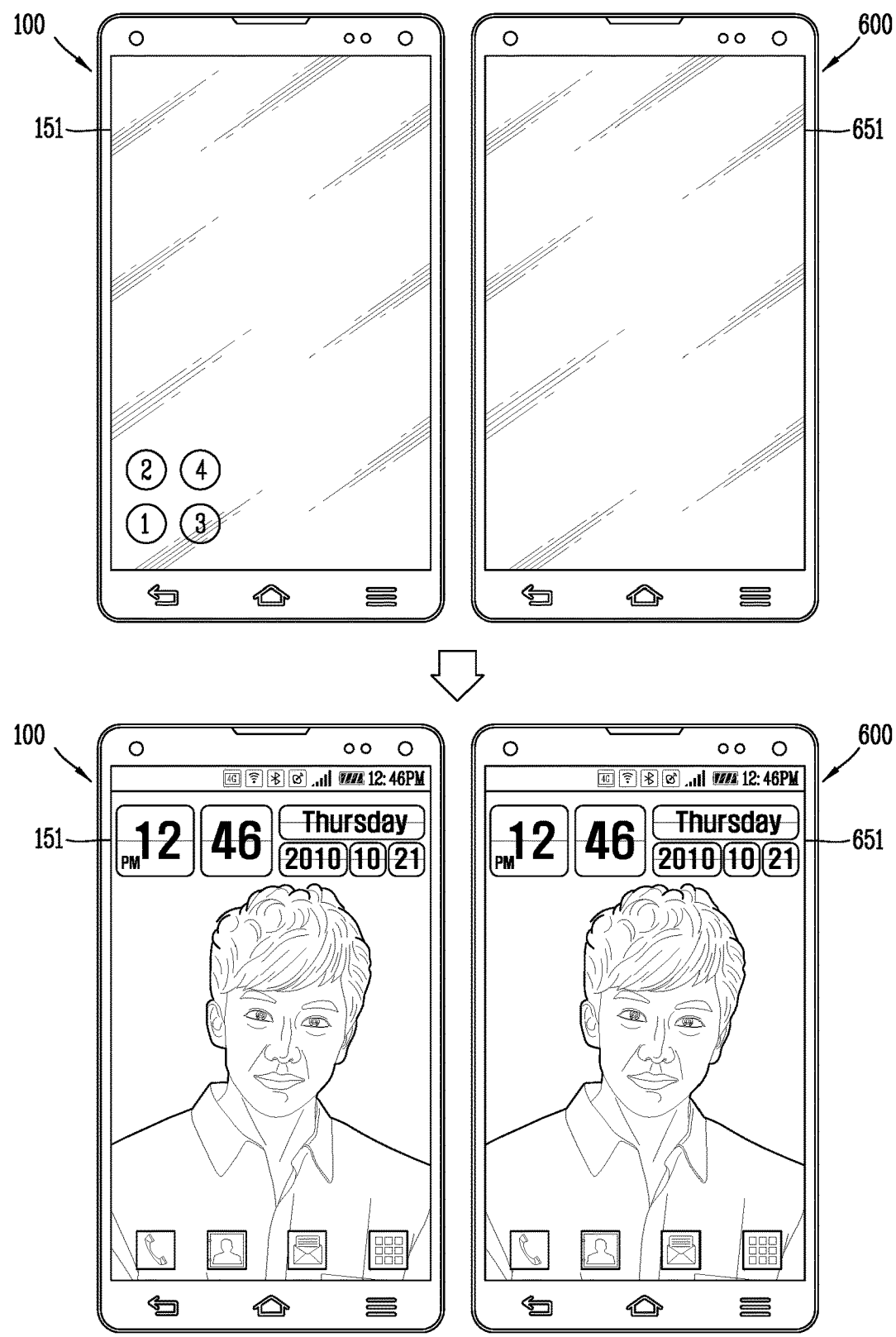
Figure 8C:
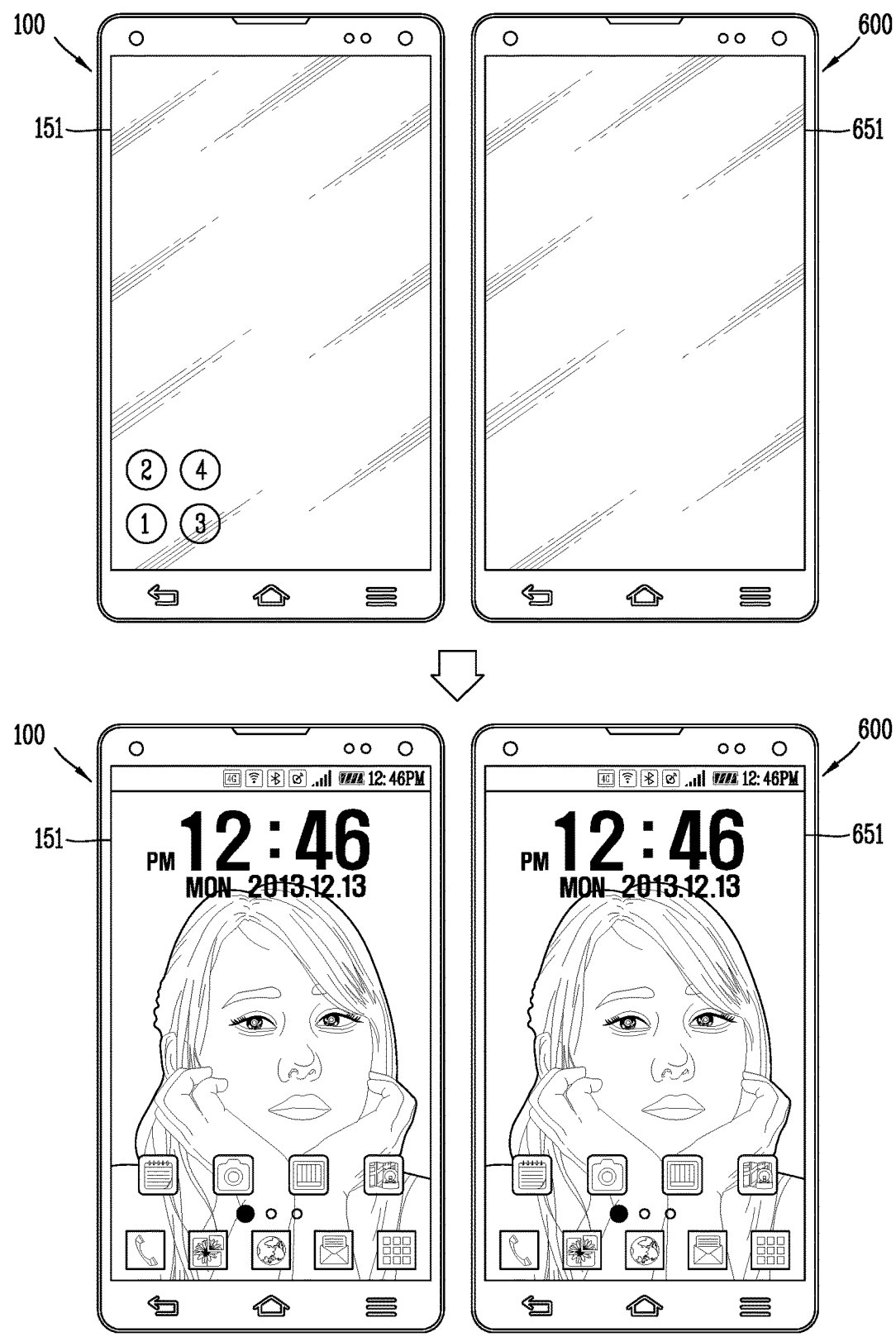
Figure 9A:
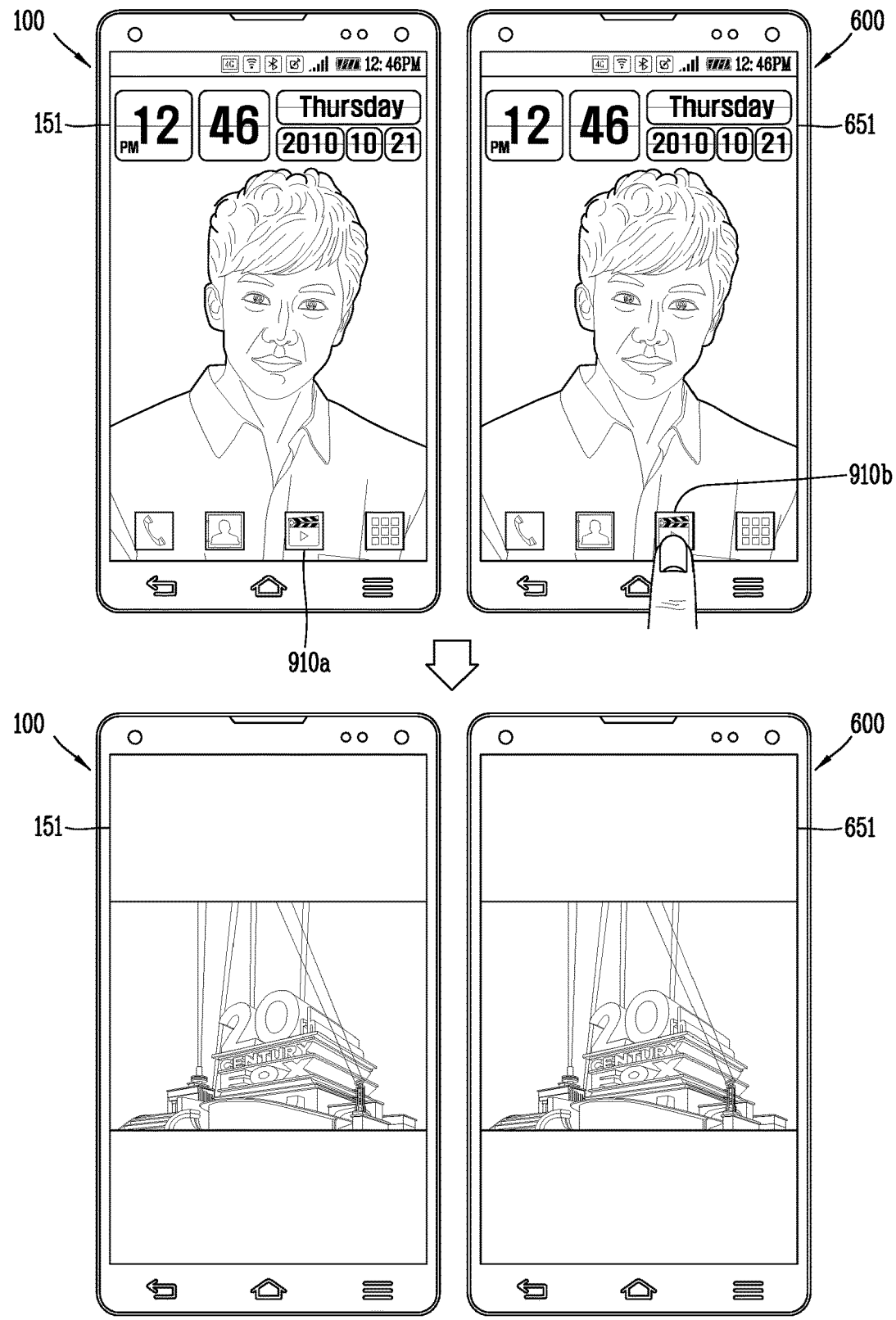
FIGS. 9A, 9B, 9C and 9D are conceptual views illustrating a method in which one of a plurality of terminals controls the others.

As another example, as illustrated in FIGS. 8B and 8C, the same screen information may be output on the first terminal 100 and the second terminal 600. In more detail, when a plurality of touch inputs applied to the virtual touch region match the first pattern set in the first terminal 100, a first execution screen corresponding to the first pattern may be output on the first touch screen 151 and the second touch screen 651, respectively. On the other hand, when a plurality of touch inputs applied to the virtual touch region match the second pattern set in the second terminal 600, a second execution screen corresponding to the second pattern may be output on the first touch screen 151 and the second touch screen 651, respectively. Related effects will be described in more detail later with reference to FIGS. 9A and 9B.

As another example, referring to FIG. 8D, one screen information may be divided into two parts to be output on the first terminal 100 and the second terminal 600, respectively. In more detail, when a plurality of touch inputs applied to the virtual touch region match the first pattern set in the first terminal 100, the first execution screen corresponding to the first pattern is divided into two parts to be output on the first touch screen 151 and the second touch screen 651, respectively. On the other hand, when a plurality of touch inputs applied to the virtual touch region match the second pattern set in the second terminal 600, the second execution screen corresponding to the second pattern is divided into two parts to be output on the first touch screen 151 and the second touch screen 651, respectively. This may allow the user to use a large screen including the first touch screen 151 and the second touch screen 651.

Meanwhile, when the first touch screen 151 and the second touch screen 651 output the same screen information, one of the first terminal 100 and the second terminal 600 may control another terminal to output the same screen information. In relation to this, description will be given in detail with reference to FIGS. 9A and 9B.

FIGS. 9A, 9B, 9C and 9D are conceptual views illustrating a method in which one of a plurality of terminals controls the others.

The same screen information may be output on the first terminal 100 and the second terminal 600 in response to a plurality of touch inputs match the first pattern or the second pattern. In more detail, when the plurality of touch inputs applied to the virtual touch region match the first pattern set in the first terminal 100, the first execution screen corresponding to the first pattern may be output on the first touch screen 151 and the second touch screen 651, respectively. In this instance, the first terminal 100 controls the second terminal 600 such that the screen information output on the first touch screen 151 can be output on the second touch screen 651. On the other hand, when the plurality of touch inputs applied to the virtual touch region match the second pattern set in the second terminal 600, the second terminal 600 controls the first terminal 100. The second terminal 600 controls the first touch 100 such that the screen information output on the second touch screen 651 can be output on the first touch screen 151.

The relationship between the first terminal 100 and the second terminal 600 may be represented as a master and a slave. According to whether touch inputs applied to the virtual region match the first or second pattern, one of the first terminal 100 and the second terminal 600 may be set as the master and another may be set as the slave. The master may operate to control the slave.

As one example, a home screen of the first terminal 100 may be output on the first touch screen 151 and the second touch screen 651. The home screen may include at least one object, and the object may be an icon of an application installed on the mobile terminal or a widget. As the home screen is output simultaneously on the first touch screen 151 and the second touch screen 651, a first object 910a and a second objet 910b both corresponding to the same function may be output on the first touch screen 151 and the second touch screen 651, respectively.

Since the first object 910a and the second object 910b are output on the virtual touch region, the master may execute an associated function with one of the first object 910a and the second object 910b, in response to a touch input applied to the one object. An execution screen of the associated function with the one object may be output on the first touch screen 151 and the second touch screen 651. That is, when a touch input is applied to the second object 910b, the first terminal 100 and the second terminal 600 may execute the same operation, similar to a case where a touch input is applied to the first object 910a. In this instance, since the first terminal 100 is used by a first user and the second terminal 600 is used by a second user, the same content can be simultaneously used by different users.

The control is substantially executed by the master, but each of the first terminal 100 and the second terminal 600 can operate as both of an output device and an input device. That is, a specific function can be executed by a touch input applied to the first touch screen 151 and also be executed by a touch input applied to the second touch screen 651. However, the first touch screen 151 and the second touch screen 651 may output the same screen information under the control of the master.

Figure 9B:
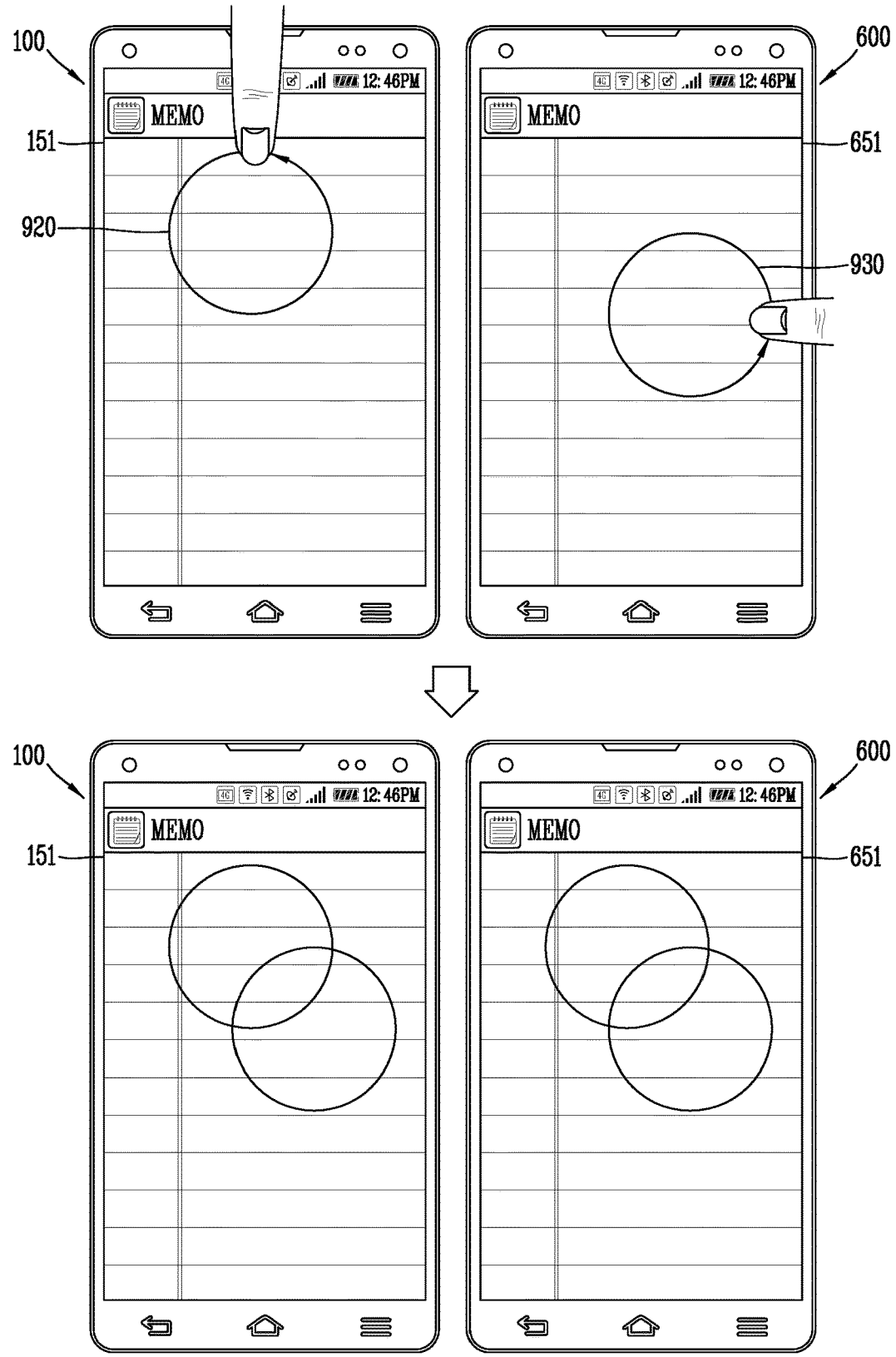

For example, as illustrated in FIG. 9B, a control function of writing a memo using touches may be executed and an execution screen corresponding to the control function may be output on both of the first touch screen 151 and the second touch screen 651. In this instance, a first touch 920 may be applied to the first touch screen 151 and a second touch 930 may be applied to the second touch screen 651. In this instance, a memo corresponding to the first touch 920 and a memo corresponding to the second touch 930 may be simultaneously output on both of the first touch screen 151 and the second touch screen 651.

Meanwhile, the master may ignore a touch input applied to the slave. In more detail, a touch input applied to a touch screen of the master is not restricted but a touch input applied to a touch screen of the slave is restricted. For example, when a plurality of touch inputs matching a first pattern are sensed, the first terminal 100 is set as a master and the second terminal 600 is set as a slave. In this instance, the first terminal 100 operates as an input device for receiving a user input and an output device for outputting screen information, and the second terminal 600 simply operates as an output device for outputting screen information. That is, the second terminal 600 does not operate as an input device.

Figure 9C:
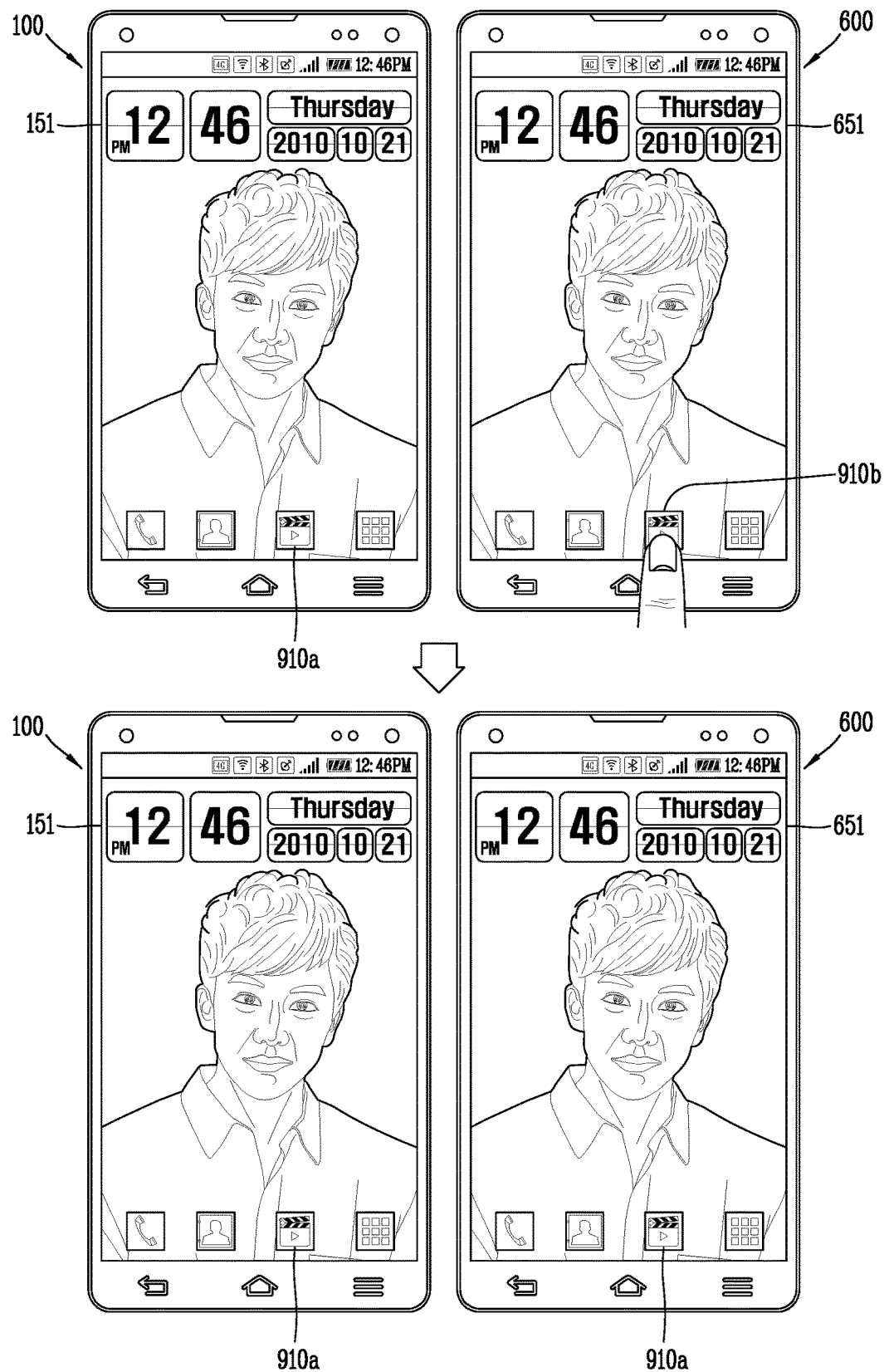

For example, as illustrated in FIG. 9C, even though a second input is sensed on the second object 910b, a function associated with the second object 910b is not executed on the first terminal 100 and the second terminal 600. On the other hand, when a touch input is sensed on the first object 910a, a function associated with the first object 910a may be executed and an execution screen of the function may be output on both of the first touch screen 151 and the second touch screen 651.

Figure 9D:
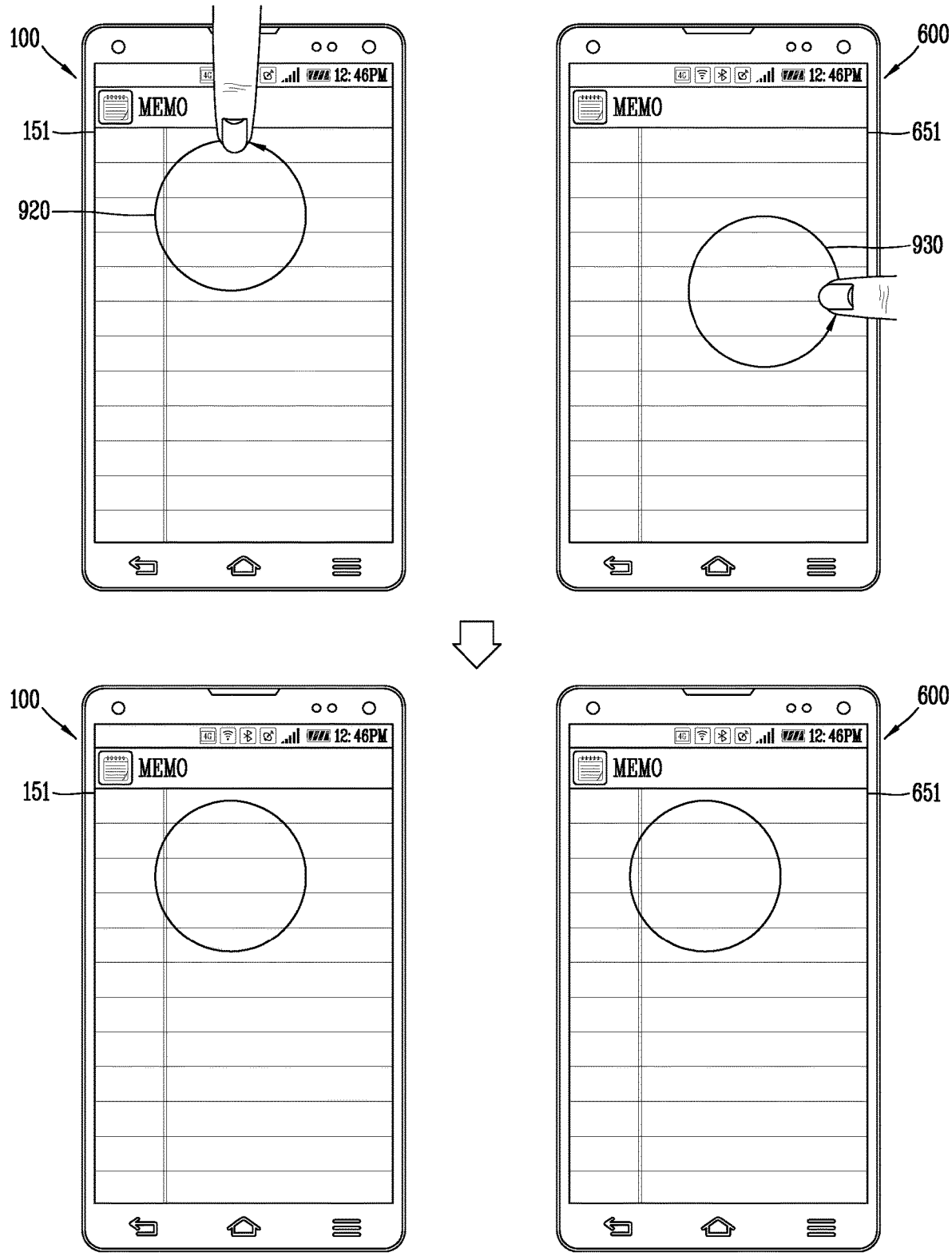

As another example, as illustrated in FIG. 9D, a control function of writing a memo using touches is executed and an execution screen corresponding to the control function may be output on both of the first touch screen 151 and the second touch screen 651. In this instance, a first touch 920 may be applied to the first touch screen 151 and a second touch 930 may be applied to the second touch screen 651. When the first terminal 100 is a master and the second terminal 600 is a slave, both of the first touch screen 151 and the second touch screen 651 output only a memo corresponding to the second touch 920 without outputting a memo corresponding to the second touch 930. This is because the touch input applied to the touch screen of the slave is ignored.

In the terminals with the relationship of the master and the slave, a user (e.g., a teacher or parents) managing a content can use a terminal corresponding to the master and a user (e.g., a student or child) simply watching the content can use a terminal corresponding to the slave, which may result in creating an effective learning environment.

Figure 10:
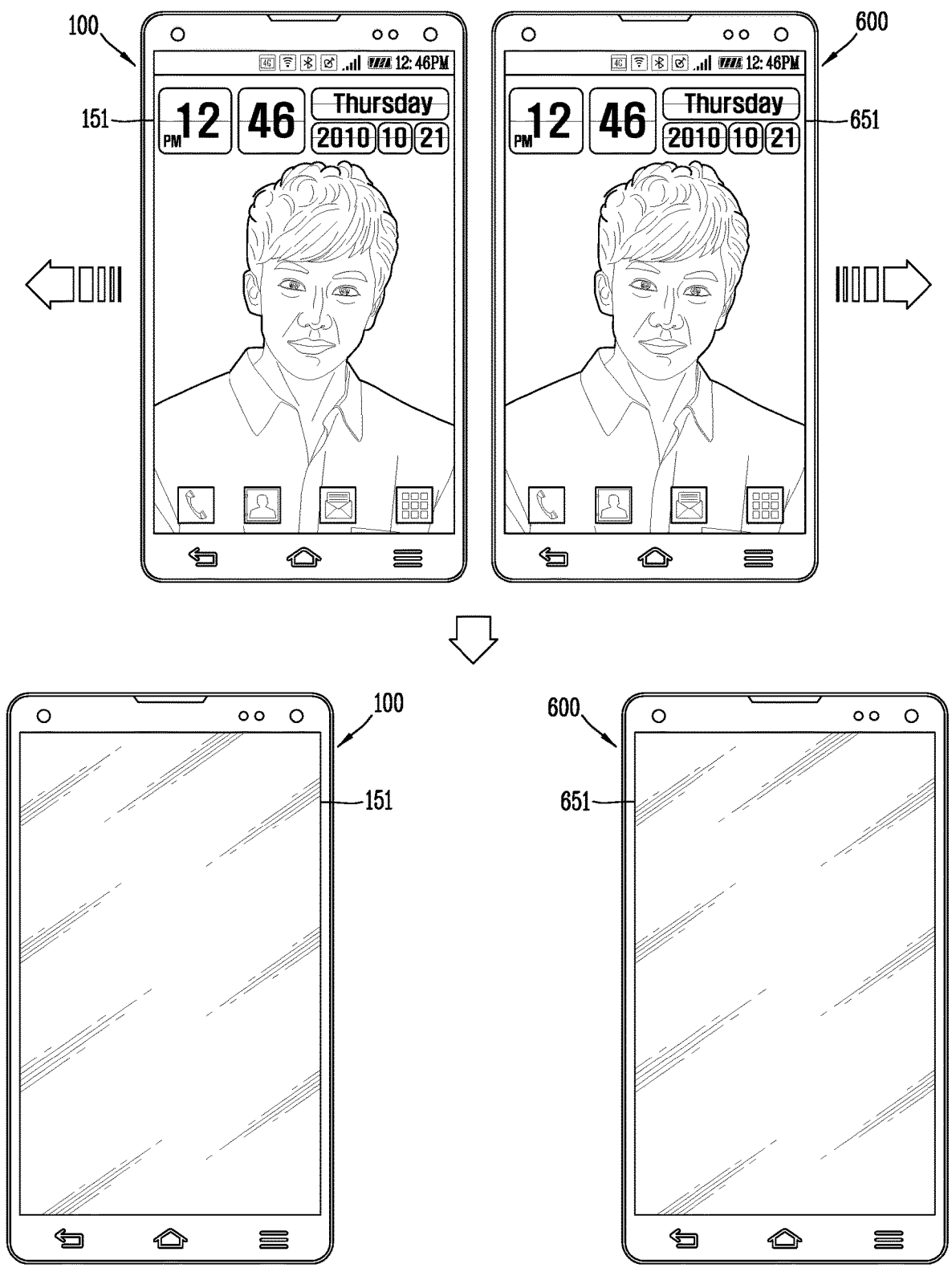
FIG. 10 is a conceptual view illustrating an operation implemented when a plurality of terminals which have been located within a predetermined distance are out of the predetermined distance.

FIG. 10 is a conceptual view illustrating an operation implemented when a plurality of terminals located within a predetermined distance are apart over the predetermined distance therebetween.

As aforementioned, when the first terminal 100 and the second terminal 600 are located within a predetermined distance and a plurality of touch inputs matching the first pattern or the second pattern are applied to the virtual touch region defined by the first touch screen 151 and the second touch screen 651, the lock states of the first terminal 100 and the second terminal 600 are unlocked, and the first touch screen 151 and the second touch screen 651 are activated.

In this state, at least one of the first terminal 100 and the second terminal 600 may sense that a distance between the first terminal 100 and the second terminal 600 exceeds the predetermined distance. For example, when the second terminal 600 is not detected within the predetermined distance, the first terminal 100 executes a locking function. In response to the execution of the locking function, the unlock state is converted into the lock state and the first touch screen 151 is converted from the activated state into a deactivated state. Similarly, when the first terminal 100 is not detected within the predetermined distance, the second terminal 600 executes the locking function. Accordingly, securities of the first terminal 100 and the second terminal 600 can be enhanced. This may allow the first terminal 100 and the second terminal 600 to operate individually again.

Figure 11:
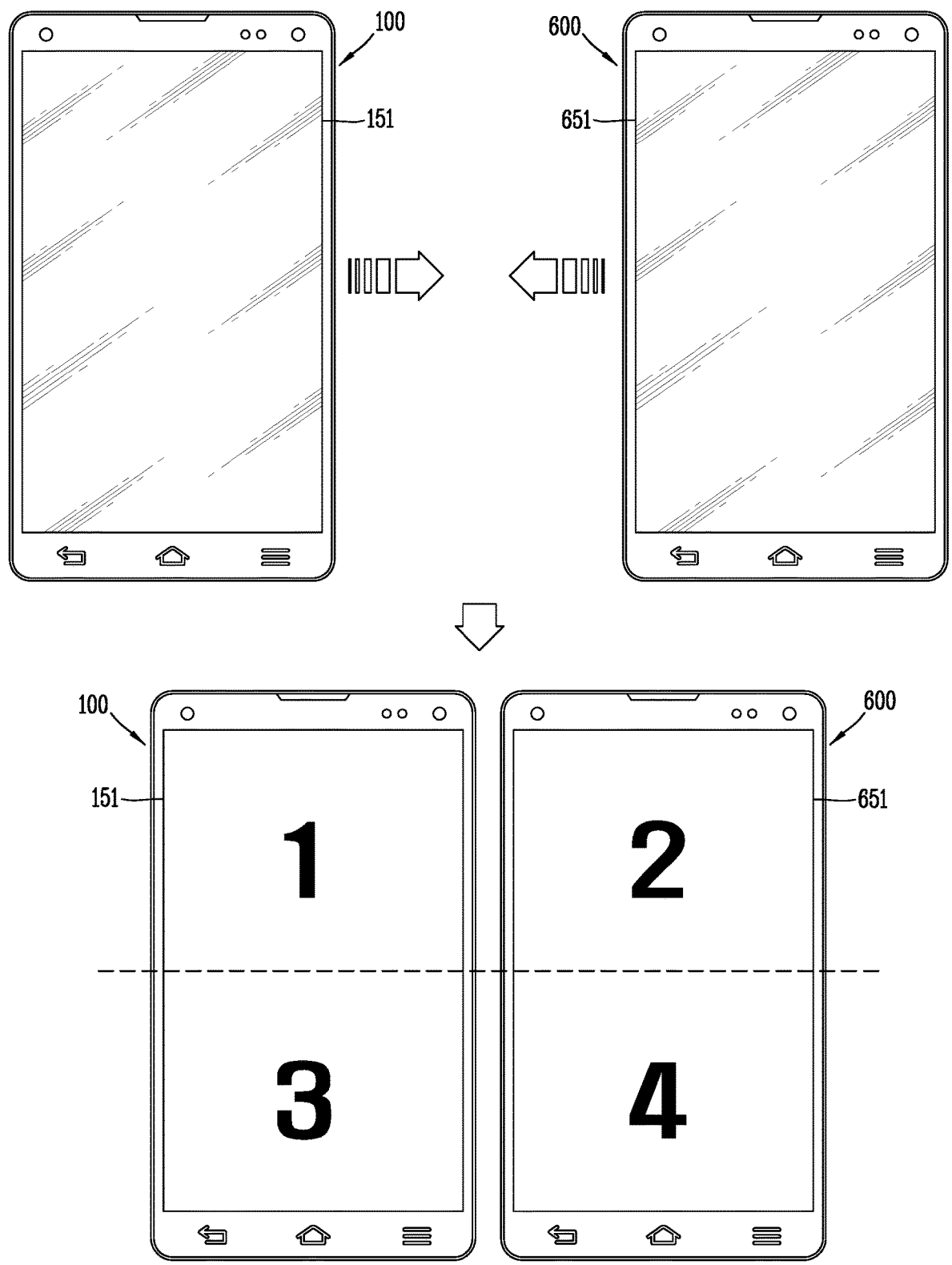
FIG. 11 is a conceptual view illustrating an operation executed when a first terminal 100 and a second terminal 600 which have been located out of a predetermined distance are currently located within the predetermined distance, in a communication system in accordance with one embodiment of the present invention.

FIG. 11 is a conceptual view illustrating an operation when the first terminal 100 and the second terminal 600 which have been located out of a predetermined distance are moved close to each other within the predetermined distance, in the communication system in accordance with the one embodiment of the present invention.

When the first terminal 100 and the second terminal 600 which have been located out of a predetermined distance are moved close to each other within the predetermined distance, at least one of the first terminal 100 and the second terminal 600 sets the virtual touch region including the entire region of the first touch screen 151 and the entire region of the second touch screen 651. And, guide lines for dividing the virtual touch region into a plurality of sub regions may be output on the virtual touch region.

Figure 12:
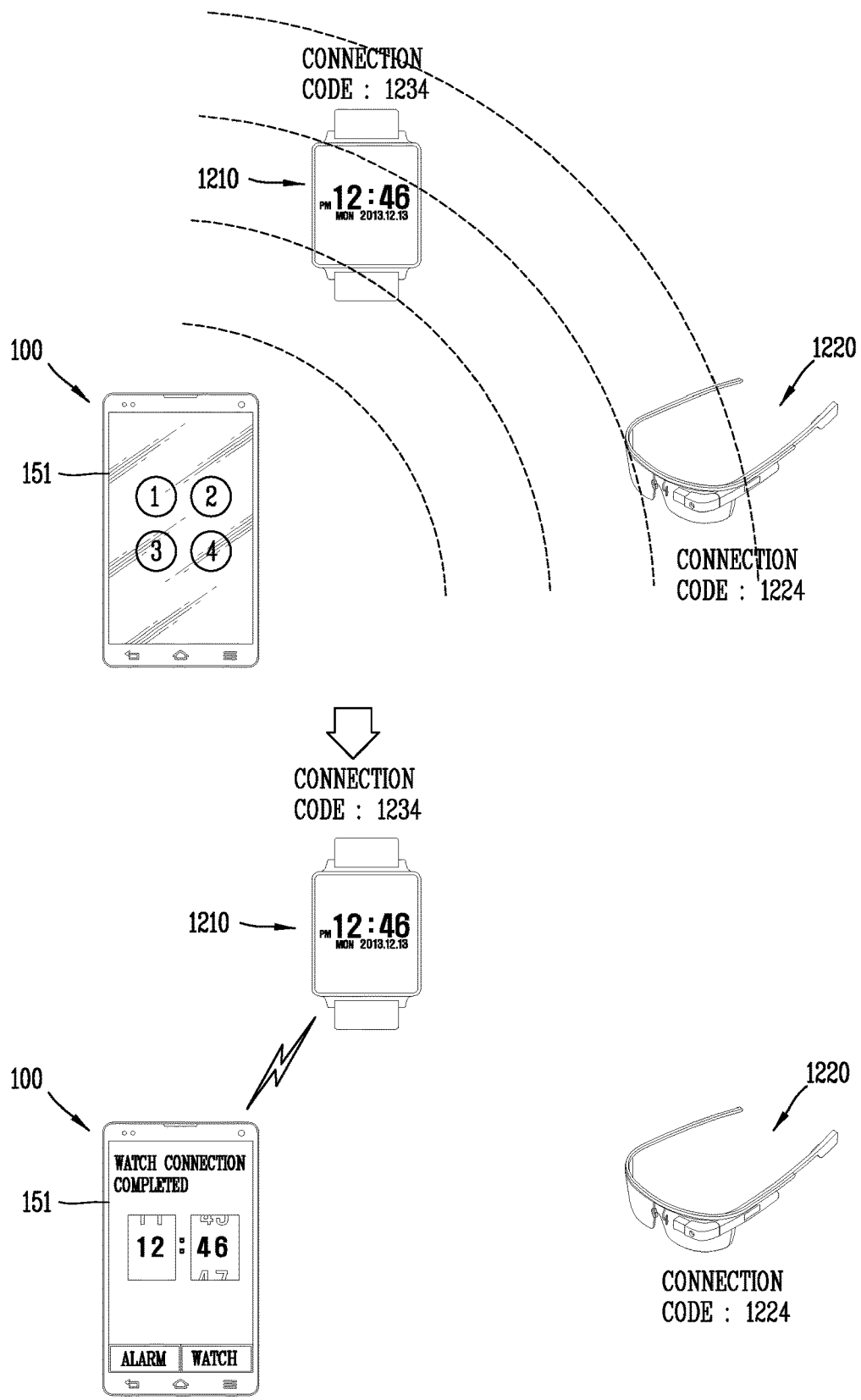
FIGS. 12 and 13 are conceptual views each illustrating an operation of selecting at least one of a plurality of terminals, located within a predetermined distance, using a connection code, in a mobile terminal in accordance with one embodiment of the present invention.

For example, as illustrated in FIG. 12, at least one of the first terminal 100 and the second terminal 600 may output on a first region guide lines for distinguishing a plurality of sub regions forming the virtual touch region, and output preset unique numbers on the divided plurality of sub regions, respectively, such that the user can identify the divided regions. Although not illustrated, the sub regions may be indicated with different colors and the user can thus recognize that the virtual region has been divided into the sub regions. The user can apply a plurality of touch inputs to at least one of the sub regions in an order and on a position satisfying one of the first pattern and the second pattern, thereby executing the unlocking function with respect to the first terminal 100 and the second terminal 600.

Meanwhile, in the communication system according to the present invention, the first terminal may unlock the lock state of the first terminal using a knock code associated with the second terminal, perform pairing with the second terminal, and also output screen information related to the second terminal. Hereinafter, a method of selecting at least one of a plurality of terminals located within a predetermined distance by use of a knock code will be described in detail with reference to FIGS. 12 and 13.

Figure 13:
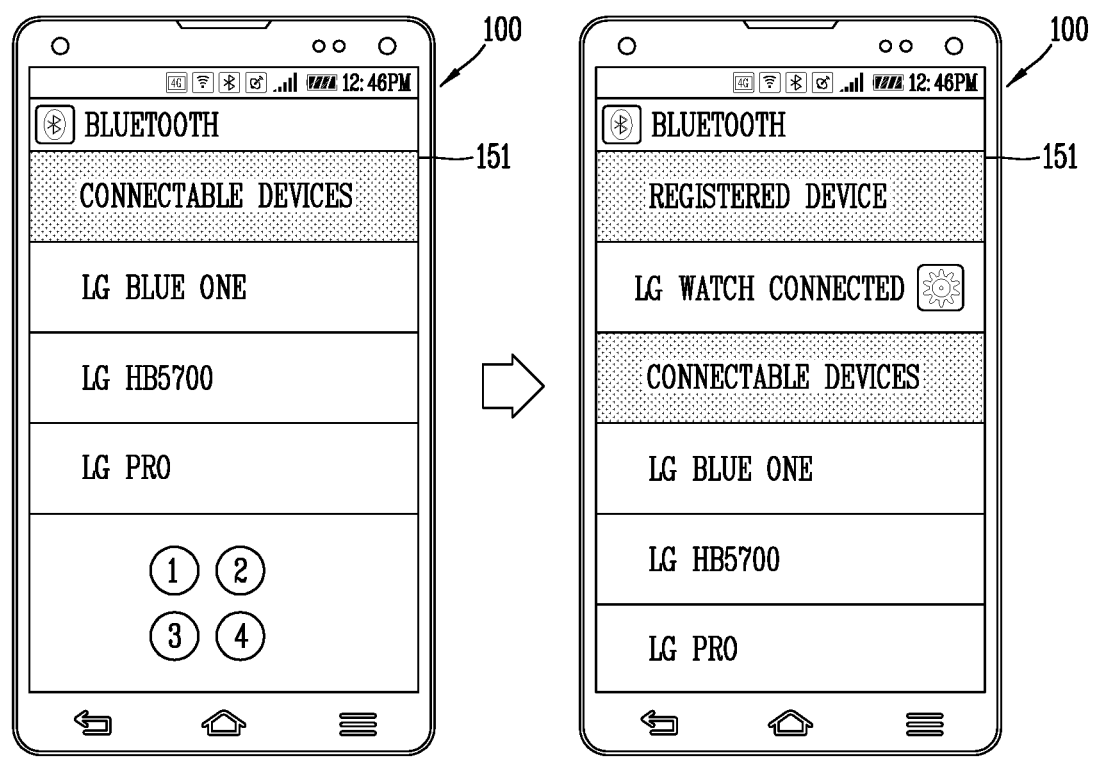

FIGS. 12 and 13 are conceptual views each illustrating an operation of selecting at least one of a plurality of terminals, located within a predetermined distance, using a connection code, in a mobile terminal in accordance with one embodiment of the present invention.

According to one embodiment of the present invention, a communication system includes a plurality of terminals. For example, as illustrated in FIG. 12, the plurality of terminals may include a first terminal 100, a watch type terminal 1210 and a glass type terminal 1220.

In the communication system, the user can control the other terminals located within a predetermined distance using the first terminal 100. In order to control an external terminal using the first terminal 100, the external terminal located within the predetermined distance should be searched for, a connection to the external terminal should be established, and a function or application associated with the external terminal should be executed.

Meanwhile, a connection pattern for establishing the connection to the external terminal may be preset in the communication system. Here, the connection pattern refers to a pattern defined by a plurality of touch inputs applied to a touch screen, and corresponds to a pattern set by the user. Hereinafter, the plurality of touch inputs matching the connection pattern are referred to as "connection code."

A knock code and a connection code have to be distinguished from each other. First, the knock code refers to a user input for unlocking a lock state of a terminal and converting the touch screen from a deactivated state into an activated state. The knock code is defined by a plurality of touch inputs that match a preset operation pattern. On the other hand, the connection code refers to a user input for establishing a connection to external terminal located within a predetermined distance and performing a function associated with the external terminal. The connection pattern is defined by a plurality of touch inputs that match a preset connection pattern.

When the connection code is input by the user, the first terminal 100 may establish a connection to an external terminal located within a predetermined distance, and automatically execute a function associated with the external terminal.

Meanwhile, the connection code may also be applied to a touch screen 151 in a deactivated state. When the connection code is applied to the touch screen 151 in the deactivated state, the first terminal 100 may convert the deactivated touch screen 151 into an activated state, in response to the connection code, establish the connection to the external terminal located within the predetermined distance, and automatically execute a function associated with the external terminal.

When the connection code is applied to the touch screen 151 in the deactivated state, the first terminal 100 may unlock the lock state in response to the connection code. Whether or not to unlock the lock state may variously be set according to embodiments. For example, when the lock state is maintained, the user may execute only the function associated with the external terminal. That is, when desiring to use a different function, the user should input the knock code or a password for unlocking the lock state. On the other hand, when the lock state is unlocked by the connection code, the user can execute a different function as well as the function associated with the external terminal.

The connection code can reduce the user's operation, thereby enabling a fast control of the external terminal and thus increasing user convenience.

Accordingly, the knock code for unlocking the lock state of the first terminal 100 is preset in the first terminal 100. Also, the connection code for establishing a connection to a specific external terminal and executing a function associated with the specific external terminal can be set in the first terminal 100.

Meanwhile, the connection code is set as a unique pattern to correspond to the specific external terminal. For example, as illustrated in FIG. 12, a first connection code (e.g., '1234') for establishing a connection to the watch type terminal 1210 and a second connection code (e.g., '1220') for establishing a connection to the glass type terminal 1220 may be set.

The connection code may be a knock code of the external terminal which is defined to release a lock state of the external terminal. For example, when a knock code of the first terminal 100 is set as "1324," and a knock code of the second terminal 600 is set as "1234," the user can apply "1234" as the knock code of the second terminal 600 to the first terminal 100, thereby connecting the first terminal 100 and the second terminal 600 to each other and executing a function associated with the second terminal 600 on the first terminal 100. Since a knock code preset in the external terminal can be used as the connection code, the user does not have to set a separate connection code.

As another example, a unique connection code for a specific external terminal may also be set in the first terminal. For example, a first connection code for connecting the watch type terminal 1210 may be set as "1234" and a second connection code for connecting the glass type terminal 1220 may be set as "1220" in the first terminal. In this instance, the user should register an external terminal, for which a function associated with the connection code is desired to be used, in the first terminal together with the connection code corresponding to the external terminal.

To this end, the first terminal 100 and the external terminal may previously establish a setting associated with a connection code based on a user input, to execute a function associated with the connection code. Security is an important issue. Therefore, security-related setting should be made in a manner that the function associated with the connection code is executed only with respect to a specific external terminal. For example, identification information for identifying an external terminal from other terminals, a unique connection code corresponding to the external terminal, security information and the like may previously be registered. After the registration, when the first terminal 100 and a specific external terminal are located within a predetermined distance, the first terminal may perform data transmission and reception with the specific external terminal and execute the function associated with the connection code using the previously-registered information.

Operations associated with the connection code will now be described as follows.

First, as illustrated in FIG. 12, a plurality of touch inputs are sensed on the first terminal 100. The first terminal 100 determines whether or not the sensed touch inputs match a preset pattern.

The preset pattern includes at least one of a pattern corresponding to a knock code and a pattern corresponding to a connection code. The first terminal executes an unlocking function when the sensed touch inputs match the knock code, whereas executing a function associated with the external terminal corresponding to the connection code when the sensed touch inputs match the connection code.

When the sensed touch inputs match the connection code, the first terminal 100 determines whether or not an external terminal matching the connection code is located within the predetermined distance. For example, as illustrated in FIG. 12, when the sensed touch inputs match "1234" as the connection code of the watch type terminal 1210, the first terminal 100 determines whether or not the watch type terminal 1210 is located within the predetermined distance. When the external terminal is located within the predetermined distance, the first terminal 100 executes data transmission and reception with the external terminal and executes a function associated with the external terminal.

In this instance, the first terminal 100 may output on the first touch screen 151 an execution screen in response to the execution of the function associated with the external terminal. Here, the execution screen of the function associated with the external terminal refers to various types of screen information which can be output on the touch screen, and corresponds to screen information that is output on the touch screen according to the execution of the function associated with the external terminal. As one example, the execution screen may be a setting screen for changing a setting value associated with the external terminal, a remote screen for generating a control command associated with the external terminal, a history screen for outputting information generated by the external terminal (e.g., consumed calories, captured image, etc.), and the like.

Meanwhile, as illustrated in FIG. 12, a plurality of touch inputs matching the connection code may be sensed on the first touch screen 151 in a deactivated state. In this instance, the first terminal 100 may release the lock state in response to the sensed touch inputs, convert the deactivated state of the first touch screen 151 into an activated state, and output an execution screen of a function associated with the specific external terminal on the activated first touch screen 151.

On the other hand, as illustrated in FIG. 13, the plurality of touch inputs matching the connection code may also be sensed on the first touch screen 151 in the activated state. In this instance, the controller 180 divides an entire region of screen information output on the touch screen into a region of outputting an object for executing an associated function and a region without outputting the object, in response to a touch. Only when the plurality of touch inputs are applied to the region without outputting the object, the controller 180 determines whether or not the touch inputs match a preset pattern. That is, the controller 180 determines whether or not the touch inputs correspond to a specific connection code. According to the determination result, the controller 180 executes a function associated with a specific external terminal set in one connection code.

For example, when the sensed touch inputs match "1234" as the connection code of the watch type terminal 1210, the first terminal 100 may execute a Bluetooth pairing function with the watch type terminal 1210. As the pairing function is executed, the watch type terminal 1210 may be connected to the first terminal 100 and notification information notifying a completion of the connection (e.g., "LG watch connected") may be output on the touch screen. Accordingly, the user can fast connect a specific external terminal desiring to connect in a simple manner.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL AVAILABILITY

Embodiments of the present invention provides a method capable of unlocking a lock state of a mobile terminal using touch inputs applied to a touch screen in the mobile terminal having the touch screen, and thus can be applied to various related industrial fields.

The invention claimed is:

1. A mobile terminal, comprising:
a wireless communication unit for transmitting and receiving data to and from an external terminal having a touch screen display unit positioned within a predetermined distance;
a touch screen converted, to another state, from one of an activated state in which the light is on and an inactivated state in which the light is off, and formed so as to sense a touch input; and
a control unit for sensing, by using the touch screen, a plurality of touch inputs to be applied to the touch screen, which is in the inactivated state, unlocking a locking state when the sensed touch inputs are matched with a preset pattern, converting the touch screen, which is in the inactivated state, into the activated state, and transmitting, to the external terminal, an unlocking command formed so as to unlock the locking state of the external terminal,
wherein the external terminal unlocks the locking state by responding to the unlocking command, and displays preset screen information on the display unit provided in the external terminal, and
wherein the control unit is further configured to:
set a virtual touch region comprising an entire region of the touch screen and an entire region of the display unit,
divide a preset screen into a first part and a second part based on the virtual touch region, wherein the preset screen is divided differently depending on the virtual touch region, and
in response to the sensed touch inputs matching the preset pattern, the first part is displayed on the touch screen and the second part is displayed on the display unit.

2. The terminal of claim 1, wherein the control unit sets a virtual touch region including an entire region of the touch screen and an entire region of the display unit of the external terminal when the external terminal is located within the predetermined distance, and
wherein the control unit unlocks the locking state, converts the touch screen from the deactivated state into the activated state, and transmits the unlocking command to the external terminal when a plurality of touch inputs applied to the virtual touch region match the preset pattern.

3. The terminal of claim 2, further comprising an optical output module configured to output light corresponding to at least one of a plurality of colors, and
wherein the control unit controls the optical output module to output light for guiding that the virtual touch region has been set, when the virtual touch region is set in response to the external terminal being located within the predetermined distance.

4. The terminal of claim 3, wherein each of the touch screen and the display unit of the external terminal outputs thereon a first execution screen corresponding to the first pattern when the sensed touch inputs match the first pattern, and
wherein each of the touch screen and the display unit of the external terminal outputs thereon a second execution screen corresponding to the second pattern when the sensed touch inputs match the second pattern.

5. The terminal of claim 3, wherein the control unit controls the external terminal such that screen information output on the touch screen is output on the display unit of the external terminal when the sensed touch inputs match the first pattern.

6. The terminal of claim 5, wherein an execution of a function by a touch input applied to the display unit of the external terminal is restricted when the external terminal is controlled by the control unit.

7. The terminal of claim 3, wherein a first execution screen corresponding to the first pattern is divided into two parts to be output on the touch screen and the display unit of the external terminal, respectively, when the sensed touch inputs match the first pattern, and
wherein a second execution screen corresponding to the second pattern is divided into two parts to be output on the touch screen and the display unit of the external terminal, respectively, when the sensed touch inputs match the second pattern.

8. The terminal of claim 1, wherein the preset pattern comprises at least one of a first pattern for unlocking the locking state of the mobile terminal, and a second pattern for unlocking a locking state of the external terminal.

9. The terminal of claim 1, wherein the control unit executes the locking state, and converts the touch screen from the activated state into the deactivated state when the external terminal is moved out of the predetermined distance.

10. The terminal of claim 1, wherein the touch screen outputs thereon a home screen of the mobile terminal, and the display unit of the external terminal outputs a home screen of the external terminal when the locking state is unlocked by the sensed plurality of touch inputs.

11. The terminal of claim 1, wherein the preset pattern is a pattern set by a user as a password for unlocking the locking state.

12. A communication system, comprising:
a first terminal provided with a first wireless communication unit and a first touch screen, and configured to sense a plurality of touch inputs applied to the first touch screen in a deactivated state with a lighting device off, the first terminal unlocking a locking state and converting the first touch screen from the deactivated state into an activated state with the lighting device on when the plurality of touch inputs sensed on the first touch screen match a preset first pattern; and
a second terminal provided with a second wireless communication unit and a second touch screen, and configured to sense a plurality of touch inputs applied to the second touch screen in a deactivated state with a lighting device off, the second terminal unlocking a locking state and converting the second touch screen from the deactivated state into an activated state with the lighting device on when the plurality of touch inputs sensed on the second touch screen match a preset second pattern,
wherein the first terminal unlocks the locking state thereof and converts the first touch screen from the deactivated state into the activated state, and the second terminal unlocks the locking state thereof and converts the second touch screen from the deactivated state into the activated state, when the first terminal and the second terminal are located within a predetermined distance and a plurality of touch inputs matching the first pattern or the second pattern are sensed on at least one of the first touch screen and the second touch screen, and
wherein the first terminal is further configured to:

set a virtual touch region comprising an entire region of the first touch screen and an entire region of the second touch screen, divide a preset screen into a first part and a second part based on the virtual touch region, wherein the preset screen is divided differently depending on the virtual touch region, and in response to the sensed touch inputs matching the preset pattern, the first part is displayed on the first touch screen and the second part is displayed on the second touch screen.

13. The system of claim 12, wherein at least one of the first touch screen and the second touch screen is a virtual touch region including an entire region of the first touch screen and an entire region of the second touch screen.

14. The system of claim 13, wherein at least one of the first pattern and the second pattern is a pattern set by a user as a password for unlocking the locking state.

15. The system of claim 12, wherein a first execution screen corresponding to the first pattern is output on each of the first touch screen and the second touch screen when the plurality of touch inputs matching the first pattern are sensed, and wherein a second execution screen corresponding to the second pattern is output on each of the first touch screen and the second touch screen when the plurality of touch inputs matching the second pattern are sensed.

16. The system of claim 12, wherein the first terminal controls the second terminal such that screen information output on the first touch screen is output on the second touch screen, when the plurality of touch inputs matching the first pattern are sensed.

17. The system of claim 16, wherein an execution of a function by a touch input applied to the second touch screen is restricted when the second terminal is controlled by the first terminal.

18. The system of claim 16, wherein the first touch screen outputs thereon a home screen of the first terminal and the second touch screen outputs thereon a home screen of the second terminal when the plurality of touch inputs matching the first pattern or the second pattern are sensed.

19. The system of claim 12, wherein a first execution screen corresponding to the first pattern is divided into two parts to be output on the first touch screen and the second touch screen, respectively, when the plurality of touch inputs matching the first pattern are sensed, and wherein a second execution screen corresponding to the second pattern is divided into two parts to be output on the first touch screen and the second touch screen, respectively, when the plurality of touch inputs matching the second pattern are sensed.

20. The system of claim 12, wherein the first terminal executes the locking state and converts the first touch screen into the deactivated state, and the second terminal executes the locking state and converts the second touch screen into the deactivated state, when at least one of the first terminal and the second terminal is moved out of the predetermined distance.

* * * * *